(12) United States Patent
Grefen et al.

(10) Patent No.: US 10,805,393 B2
(45) Date of Patent: Oct. 13, 2020

(54) SYSTEM AND METHOD FOR DATA MANAGEMENT STRUCTURE USING AUDITABLE DELTA RECORDS IN A DISTRIBUTED ENVIRONMENT

(71) Applicant: Olea Networks, Inc., Austin, TX (US)

(72) Inventors: Stefan Grefen, Nierstein (DE); Astrid Jaehde, Austin, TX (US); David Mackie, Austin, TX (US)

(73) Assignee: Olea Networks, Inc., Austin, TX (US)

( * ) Notice: Subject to any disclaimer, the term of this patent is extended or adjusted under 35 U.S.C. 154(b) by 514 days.

(21) Appl. No.: 15/367,873

(22) Filed: Dec. 2, 2016

(65) Prior Publication Data

US 2017/0163733 A1 Jun. 8, 2017

Related U.S. Application Data

(60) Provisional application No. 62/262,033, filed on Dec. 2, 2015.

(51) Int. Cl.
*G06F 15/16* (2006.01)
*H04L 29/08* (2006.01)
*H04L 9/32* (2006.01)

(52) U.S. Cl.
CPC ........ *H04L 67/1097* (2013.01); *H04L 9/3236* (2013.01); *H04L 67/12* (2013.01);
(Continued)

(58) Field of Classification Search
CPC ............. H04L 2209/38; H04L 2209/60; H04L 67/1097; H04L 67/12; H04L 67/20; H04L 9/3236
See application file for complete search history.

(56) References Cited

U.S. PATENT DOCUMENTS

2016/0028552 A1* 1/2016 Spanos ................. H04L 9/3297
713/178
2016/0162897 A1 6/2016 Feeney
(Continued)

OTHER PUBLICATIONS

Nakamoto, "Bitcoin: A Peer to Peer Electronic Cash System", 9 pgs.
(Continued)

*Primary Examiner* — Normin Abedin
(74) *Attorney, Agent, or Firm* — Egan Peterman Enders Huston

(57) ABSTRACT

A system and method of recording data from a number of devices in a distributed network system in a manner adaptable for auditing the device output. The devices may include one or more control, sensor, edge, or peripheral computing devices physically separate in the distributed network system and in communication with a control server. Such distributed networks systems are common in SCADA or IoT applications. The content stream of data records output from the devices are recorded; a payload stripped stream of data records which are stripped of the payload are recorded and preferably retained by an escrow service. The metadata of the data records includes the hash value of one or more predecessor data records. The hash values are calculated based on the payload and a linkage function, preferably a cryptographic function. A comparison of hash values of the payload stripped stream and the content stream provides the audit ability.

27 Claims, 18 Drawing Sheets

(52) U.S. Cl.
CPC .......... *H04L 67/20* (2013.01); *H04L 2209/38* (2013.01); *H04L 2209/60* (2013.01)

(56) References Cited

U.S. PATENT DOCUMENTS

| | | |
|---|---|---|
| 2016/0205106 A1* | 7/2016 | Yacoub ............... H04L 61/1511 726/28 |
| 2016/0218879 A1 | 7/2016 | Ferrin |
| 2016/0259937 A1 | 9/2016 | Ford et al. |
| 2016/0299918 A1 | 10/2016 | Ford |
| 2016/0306982 A1 | 10/2016 | Seger, II et al. |

OTHER PUBLICATIONS

Wikipedia, "Blockchain", 7 pgs., Printed From Internet Oct. 27, 2016.

* cited by examiner

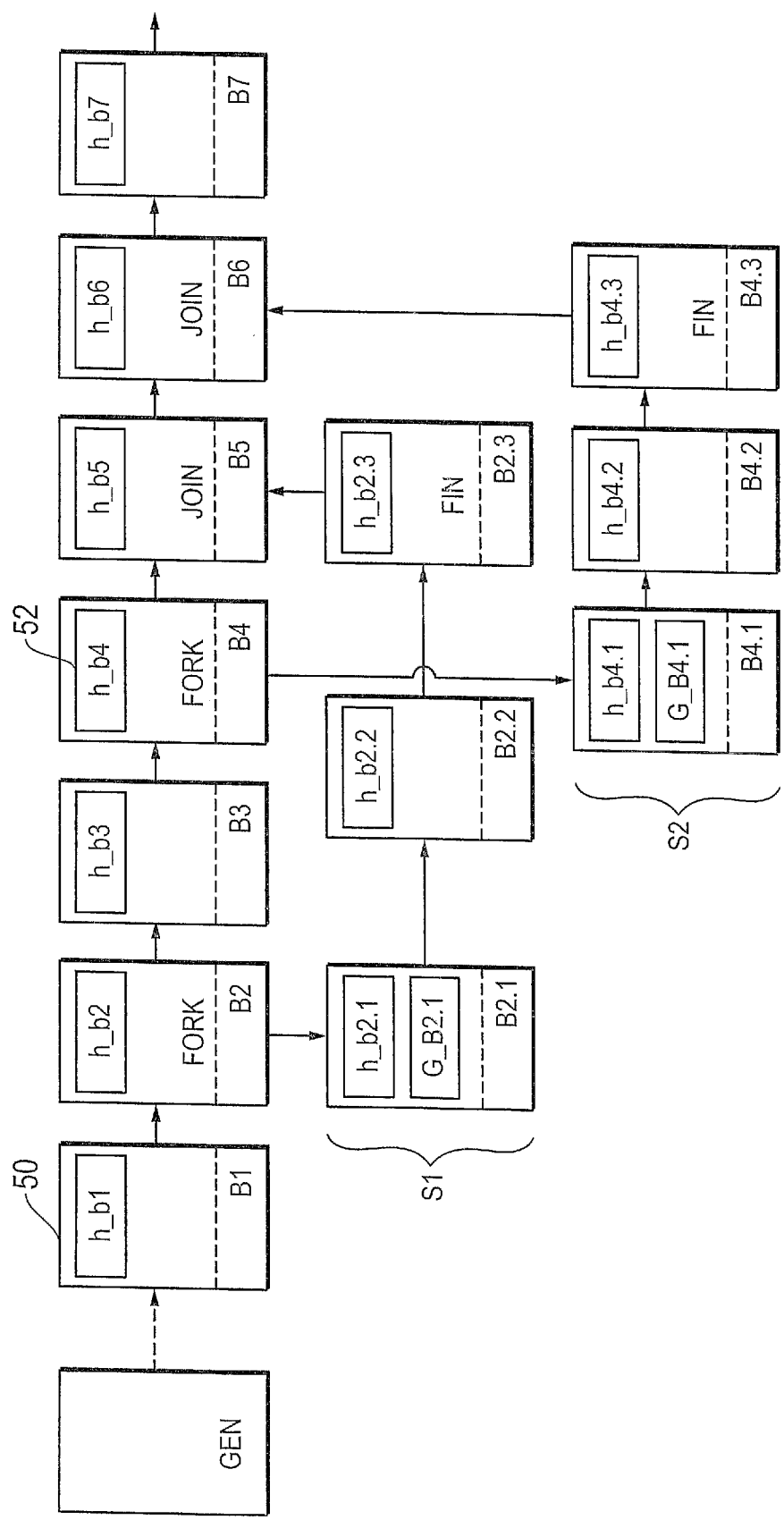
FIG. 6.a

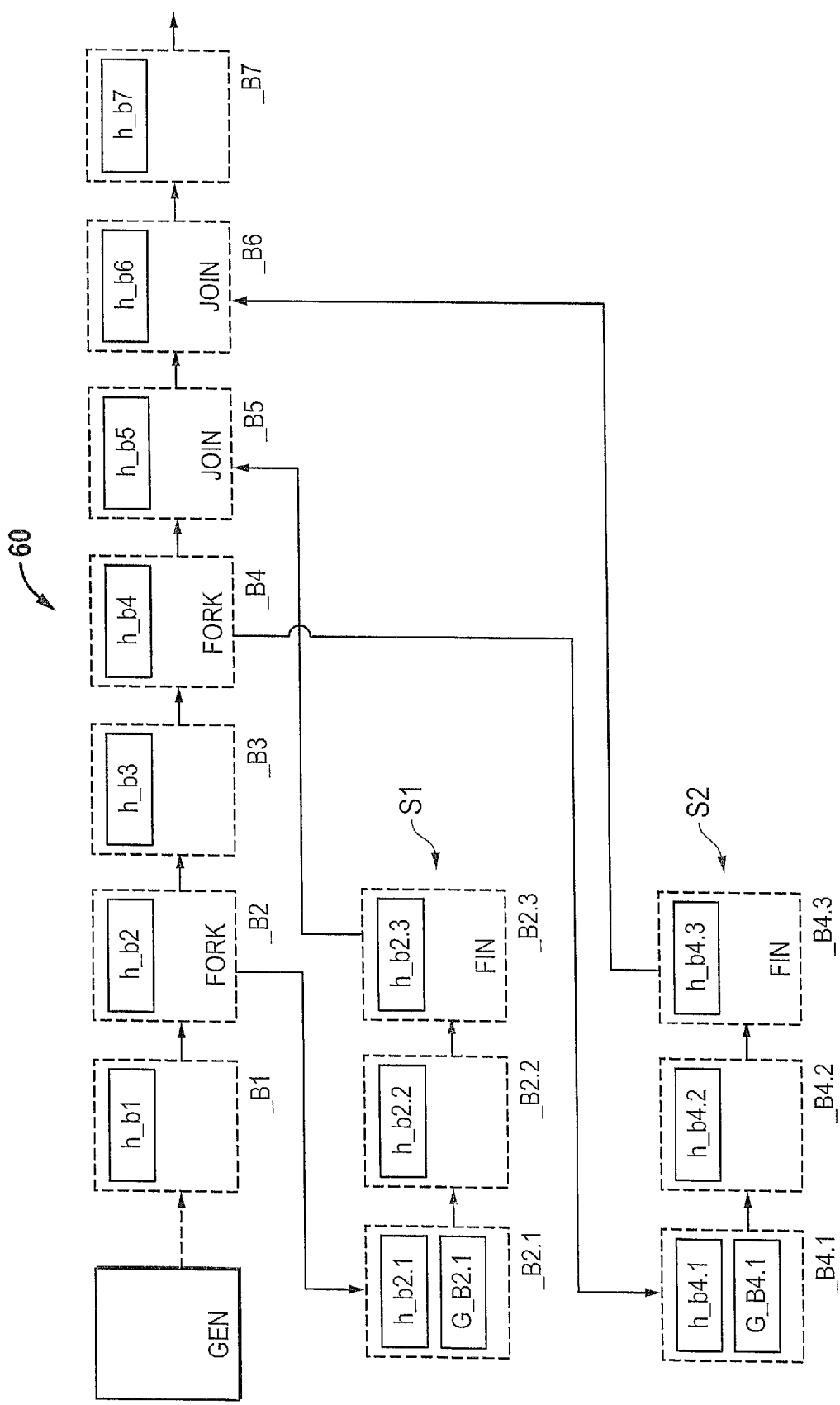
FIG. 6.b

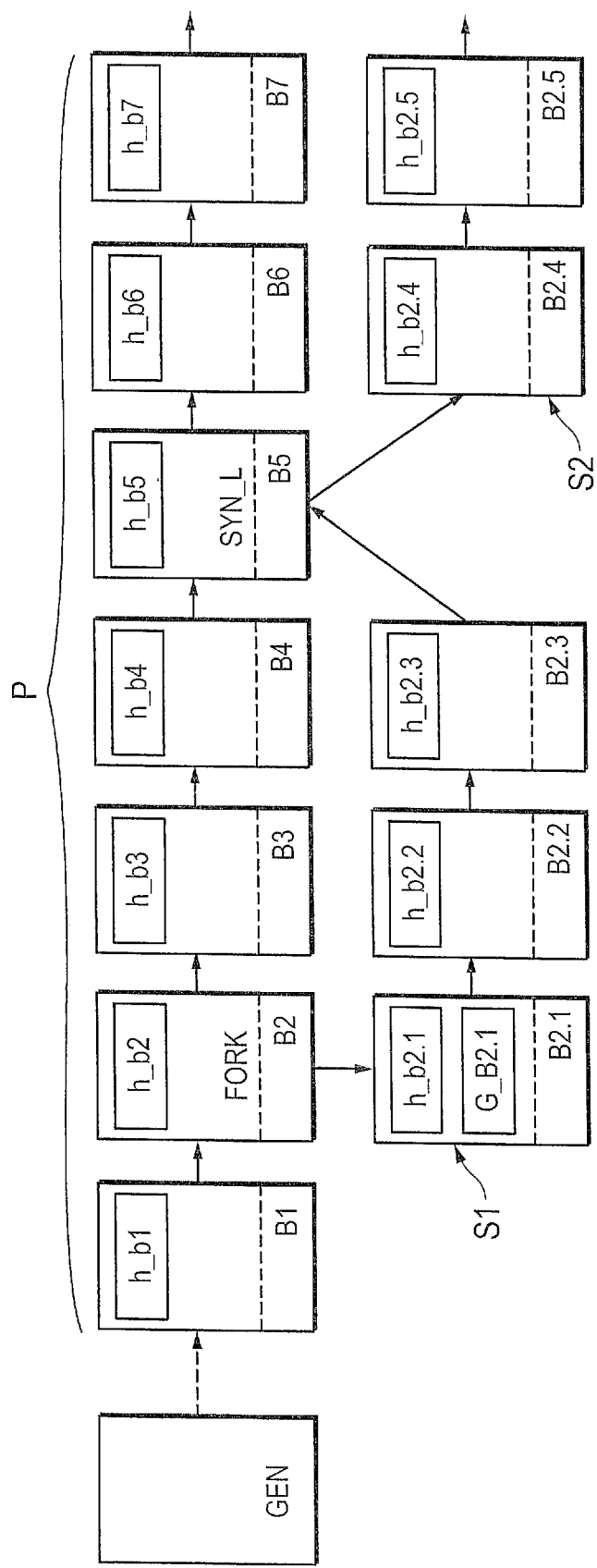
FIG. 7.α

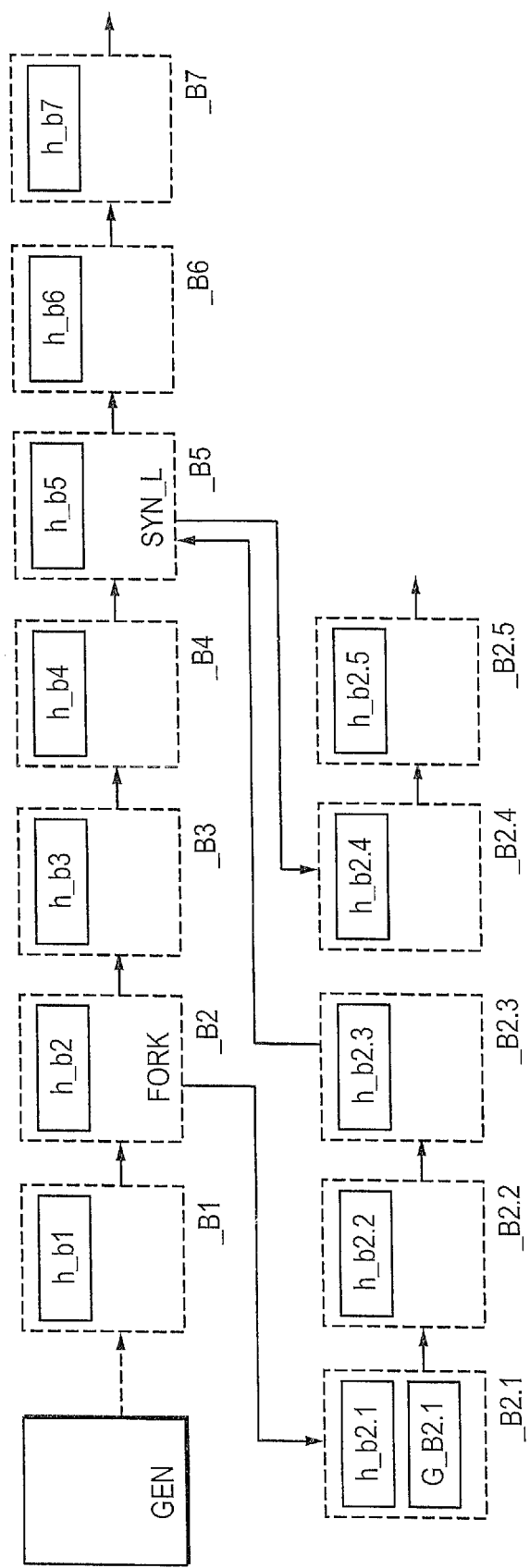
FIG. 7.b

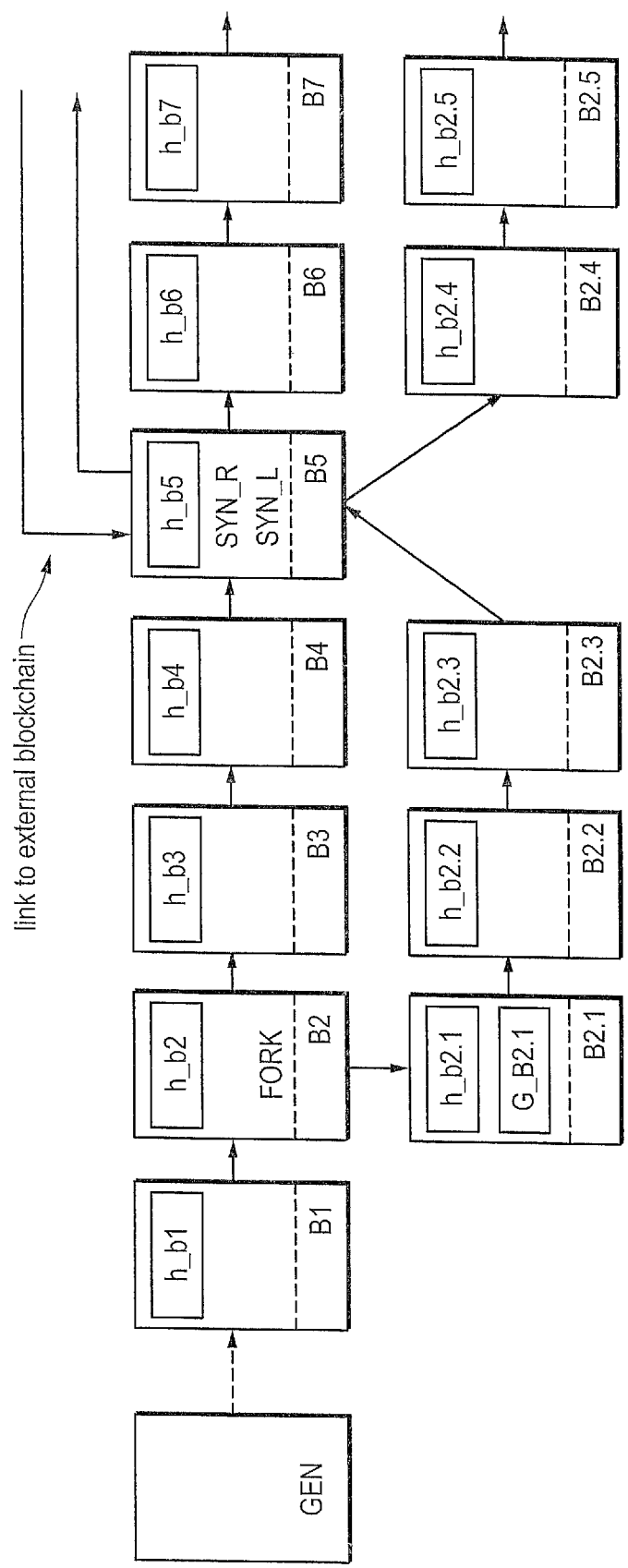
FIG. 8.α

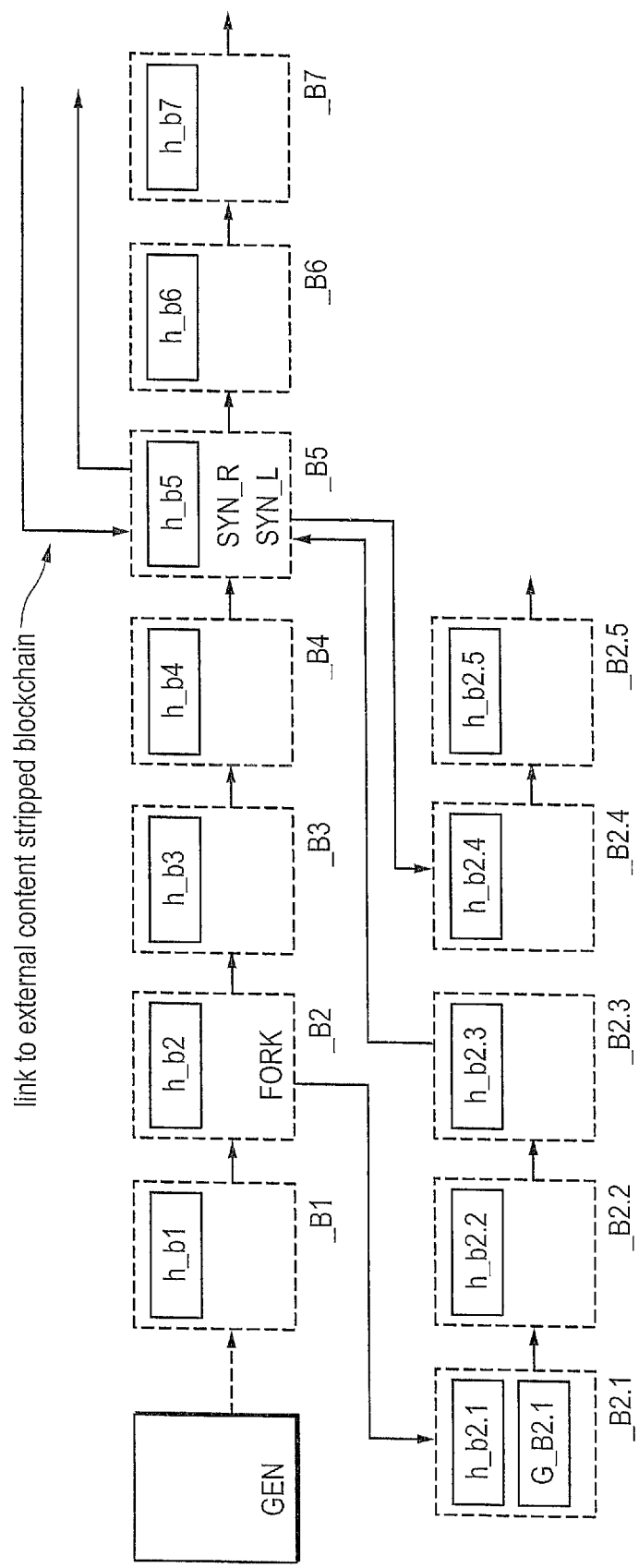
FIG. 8.b

SYSTEM AND METHOD FOR DATA MANAGEMENT STRUCTURE USING AUDITABLE DELTA RECORDS IN A DISTRIBUTED ENVIRONMENT

PRIORITY

The present application claims priority to U.S. Provisional Application No. 62/262,033 filed Dec. 2, 2015.

BACKGROUND

Field of the Invention

The present invention relates to systems and methods for generating audit data for distributed systems of sensor and control devices such as industrial and IoT systems. In preferred forms, the systems and methods store audit data as the payload of a series of data records linked by a hash function such as a cryptographic hash function.

Description of the Related Art

During the last decade, installations in the Internet of Things ("IoT") realm have been multiplying. In urban infrastructure, electronic devices to control technical equipment and sensor devices for data collections are ubiquitous. Examples are devices in traffic regulation systems or for the collection and transmission of environmental data, such as water level indicators, or sensor devices to measure temperature, humidity, or air quality parameters. Electronic sensor or control devices also are used in industrial installations, agriculture, transportation, pipe infrastructures, and outdoor installations, such as mining or construction sites.

The sensor and control devices generate vast amounts of data that constitute significant value and typically the ability to audit such data is desirable. However, since such devices are usually deployed in insecure or remote locations, outside the perimeter of a secure datacenter, the generation and processing of audit data in a manner that is compliant with regulatory standards may be challenging. For instance, the operator of a technical installation may be under the obligation to prove the identity of a given device (e.g. authenticated) that generated a stream of audit data, i.e. demonstrate that present audit data indeed stem from that device, and not from another device that spoofed the identity of the former device. The operator also may need to prove the completeness of the set of audit data, that no data sent to the device have been lost, for instance due to a network failure or been erased from the audit data store in an attempt to tamper.

A few examples of the use of audit data for forensic evidence or to prove fulfillment of contractual obligations are:

A traffic control system at an intersection generates photographic images of cars that pass the intersection during a red light. The operator of the traffic control system is under obligation to prove that the traffic light indeed had been red when the photo of the car had been taken, and may be legally challenged to do so.

In complex industrial installations, typically multiple independent entities own and operate equipment. An operator of a machinery may need to prove correctness of its operation and fulfillment of contractual obligations. For instance, in a pipe infrastructure this may entail keeping the pressure in a pipe within prescribed limits and take corrective actions otherwise. In the investigation of an incident, the veracity of logging data generated by the sensor and control devices of the machinery may be challenged, since the devices are deployed in an insecure location.

In many cases devices in outdoor IoT installations are not connected to the electrical grid, but work with electrical energy supplied by batteries or solar cells. Resource management is a concern. A device may not be able to at all times process all audit data intended to be generated; it may not have sufficient energy reserves to do so. Thus, another challenge in the design of an audit method for IoT devices in outdoor locations is tolerance of intermittent outages of energy or network connectivity. Assuming that a device may not be able to send all data intended for an audit at all times and do so in a manner of best effort, the data that are transmitted need to satisfy audit requirements, proof of the identity of the device from which they originate and completeness.

Data recording and auditing capabilities are a standard requirement in many industrial processes, computing systems and technical processes. Application software, operating systems, or components in industrial installation typically are required to log events and keep logs of the history of their operation. The log data that are generated alongside the manufacturing of a product nowadays constitute significant value. For instance, in a fab, if the stream of quality control data logged in the course of the production of a microchip is incomplete, the quality of the chip cannot be assessed and the chip is deemed to be unusable or not of first grade quality.

With increasing complexity of technical installations, tighter environmental standards and other regulations, the audit data collected alongside a technical process constitute a part of the value add achieved by a technical infrastructure. Examples are industrial production processes, or installations to guarantee environmental standards, such as emission control, or installations for data collections used by law enforcement, such as traffic monitoring and control. Audit data as well are relevant for a forensic investigation after an accident.

For instance, a sensor device of an Internet of Things, IoT, installation might measure environmental properties or signals, such as air temperature or sonic signals. A controller in an industrial installation may be a pressure regulator that also needs to generate a data log about its operation. Such data need to be saved for a possible later inspection, for various purposes, for general auditing and for example to prove an environmental parameter within limits.

Stakes might be high in terms of the value of the objects of auditing, which raises requirements towards the quality of audit data and security of the audit process. In addition, audit data often need to be used by multiple parties, and thus require access privileges and filters. An auditing infrastructure often needs to be designed for operational convenience for random audits as well as on demand audit access, such as after an incident.

Logging and auditing of the operation of peripheral computing devices that are typically used to achieve the tasks in industrial and IoT environments, such as sensor devices, or controllers, may pose specific challenges. Such computing devices often are installed in insecure locations, outdoors or in large and complex technical infrastructures, where a device may be damaged,—by chance or as a result of an incident for whose analysis its data collections were relevant. A device may be interchanged, lost, stolen, or replaced with malicious intent, to spoof its identity. Moreover, such peripheral computing device typically has insufficient computational capacity, CPU power and memory, to run powerful security algorithms. The computational strength of a device for generating true randomness is limited, and this in turn affects the strength of a key based algorithm that requires the generation of random numbers, making the device vulnerable for spoofing.

Additionally, in industrial and IoT environments components are often located outdoors and frequently are not connected to the electric grid, but run on batteries or battery backed solar power. Such devices might intermittently go into hibernation mode or shut off once battery resources are exhausted.

Designing for reliability of operations under the condition of limited computing capacity, and storage, and limited power, potentially with intermittent outages, is a difficult task. The problems described above pose challenges for implementing security and creating reliable audit traces for most devices, but in particular industrial and IoT installations in insecure locations.

Various patents and applications have addressed different aspects of the problems described above, e.g., US20160028552A1; U.S. Pat. No. 6,868,406B1; US20160217436A1; US20160299918A1; US20160275461A1; WO2015173434A1 (incorporated by reference).

SUMMARY

The problems outlined above are addressed by the systems and methods for recording data from devices in a distributed network system adaptable for audit and methods for auditing a stream of data records in accordance with the present invention. Broadly speaking, a method of recording data from a number of devices in a distributed network system in a manner adaptable for audit, includes recording a content stream of data records output from a number of devices where each record has a payload segment including content from the devices and a metadata segment. Preferably the metadata segment includes the hash value of a predecessor record in the stream. A payload stripped stream of said data records is recorded where the payload stripped stream does not include the payload segments and the payload stripped stream is stored as an escrow file.

In a broad form, one system for collecting audit records from a number of devices in accordance with the present invention includes a number of devices in a distributed network system which communicate with a data repository. Such devices, may, for example, be control, sensor, edge, or peripheral computing devices in an industrial process such as SCADA or an IoT network. The devices generate a content stream of data records, each data record in the content stream having a payload segment and a metadata segment, where the devices and central repository operate to generate a stream of data records stripped of the payload segment and the metadata segment includes the hash value of a predecessor data record. The system includes a communication network (wired or wireless) between the devices and the central repository. Additionally, the system includes a content database connected to the central repository for recording the content stream from the devices and an audit database which records the payload stripped stream.

BRIEF DESCRIPTION OF THE DRAWINGS

FIG. 6.a is a block diagram of an example of primary and secondary subchains;

FIG. 6.b is a block diagram of an example payload stripped stream corresponding to the subchains of FIG. 6.a;

FIG. 7.a is a block diagram of a blockchain with a local synchronization record;

FIG. 7.b is a block diagram of an example payload stripped stream of the blockchain of FIG. 7.a;

FIG. 8.a is a block diagram of a blockchain similar to FIG. 7.a and includes a remote synchronization record;

FIG. 8.b is a block diagram of an example payload stripped stream of the blockchain of FIG. 8.a;

DESCRIPTION OF PREFERRED EMBODIMENTS

Overview

In one form, this invention describes a method for generating audit data and an infrastructure for processing and storing audit data. The method is based on storing audit data as the payload of a series of records linked by a cryptographic hash calculation, sometimes referred to herein as an "audit blockchain." The data structure of an audit blockchain is similar to the one of a blockchain used in the architecture of Bitcoin. A basic premise that makes an audit blockchain suited for audit purposes, is that the payload of records of the audit blockchain cannot be changed without modifying the value of the cryptographic hash calculated from it. Storing the latter at a safe location then provides for immutability of the audit data and safety from tamper. The properties of an audit blockchain are often important in the further design of the audit method to ensure proof of identity for a device sending the data and tolerance of intermittent outages of that device, or its operation under conditions of constrained resources. In a broad aspect one method described herein for generating and processing audit data is universally applicable, beyond IoT devices, since it addresses many of the problems described herein. The design of the audit methods lends itself to the use in a multi-tenancy configuration, also providing means for correlation of data from distinct users. Moreover, many of the audit blockchains described herein provide a solution for crucial concerns about data privacy that presently available audit methods do not address.

In another form, the present invention includes a method for the generation and management of a data stream for audit purposes that is based on sequences of records linked by hash values. Linking a sequence of records by hash values is a central concept in the blockchain model of Bitcoin and and other models for digital signatures, for instance the timestamp server of Usenet. In the present application, a sequence of records linked by hash values is sometimes called an audit blockchain, to distinguish it from the blockchain concept of Bitcoin.

Figure 1:
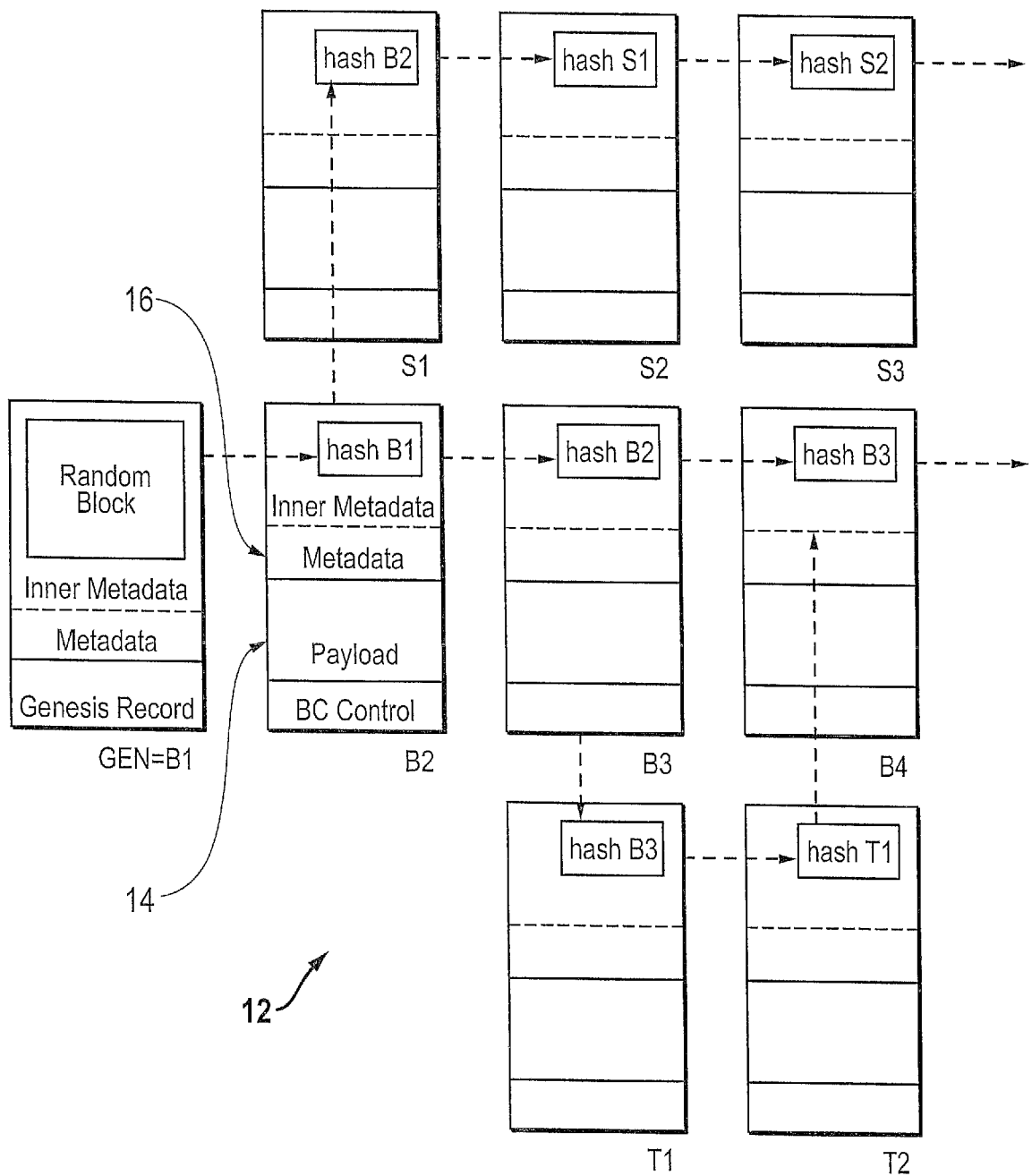
FIG. 1 is a block diagram of a blockchain or content stream of records.

FIG. 1 shows an example of an audit blockchain labeled a "content stream" 12 because it includes a payload. The content stream 12 consists of a number of records B1, . . . , B4, S1, . . . , S3 and T1, T2. Each record consists of a payload 14, metadata 16, and inner metadata 18. A record may have a payload of length zero.

The payload 14 of a record contains data belonging to the data stream of the audit blockchain 12. The data stream is made up of any set of data to be saved for later audit, including for instance log files, data generated by an application, the operation system, or firmware, binary dumps, output from a number of control or sensor devise, etc. A data stream is divided into packets that are included as payload of an audit blockchain.

The metadata segment (16, 18) of a record is made up of any data required to implement the properties of an audit blockchain, and further data to manage its payload, such as to implement access privileges and multi-tenancy. In particular, the metadata 16,18 of a record contains the hash value of its successor record, preferably calculated by means of a cryptographic hash function, such as MD5, SHA-1, SHA-2, or SHA-3. For instance, record B3 contains in its metadata a hash value, hash B2, that has been calculated of the metadata and payload sections of record B2. Function hash also is referred to as linkage function. A linkage function can be any function that poses a strong computational challenge, in its complexity comparable to a cryptographic function.

The metadata section 16,18 may contain a subsection, the inner metadata section 18, a section that is comprised of a distinguished set of data that have a special role in implementing the audit process in accordance with one aspect of this invention. The inner metadata section 18 typically contains the hash value of the immediate predecessor record. The data structures for a record, such as B2 in FIG. 1, may be such that inner metadata 18, metadata 16, 18 and payload 14 may be contiguous areas of memory, or any other suited data structures, such as trees or linked lists of records.

Records of an implementation of an audit blockchain may also contain blockchain control data, in FIG. 1 denoted BC Control 20. BC Control 20 helps to store helper data that may be used for the efficient management of the audit blockchain. For instance, BC Control 20 may contain serial numbers for records, and information for flow control. As records are passed between components of the audit system, the content of the blockchain control data 20 may be modified. The hash value of a record is created of the data that make up the set theoretic differences of the data of the entire record and its blockchain control data, i.e. all data of the record except the latter. As a record is processed by components of present audit system, the blockchain control data 20 are the only data of the record that may be modified. The remainder of a record cannot be changed, as it is used in the calculation of the hash for the predecessor record.

The property that a record contains a hash value built of data structures of the preceding record is referred to as linkage by hash. It is used, analogous to blockchains used in Bitcoin or in the data model of the Usenet time server, to store a series of data records in the order they were created and protect them from tamper. To modify the payload 14 or metadata 16,18 of a given record of an audit blockchain requires modifying all successors of that record, to preserve the property that a record contains the hash value of its predecessor. This is a challenge for which no solution may exist at all, or if one exists, it amounts to finding the key of the cryptographic hash function used to calculate the hash value, a computationally difficult task. Thus, a linkage function is chosen based in part on the desired security, but most cryptographic hash functions are statistically impossible to solve in a timeframe relevant for an audit based on current technology.

In FIG. 1, records connected by an arrow are linked by hash. In other words, two records, B1 and B2, are linked by hash, if B2 is an immediate predecessor of B1, which means the metadata of B2 contain the hash value of record B1. A record can have multiple predecessors, i.e. it can have a linkage by hash relationship with multiple immediate predecessor records. The entirety of linkage by hash relationships of an audit blockchain or subchain thereof make up the blockchain topology. The first record of a blockchain is called the genesis record, denoted GEN or B1 in FIG. 1. GEN contains a block with a random sequence of data in its metadata and typically has a zero length payload.

Assumed the hash value contained in the metadata of at least the last record is stored by an independent party, the audit service provider, a later modification of a stored block chain can be detected. To maintain linkage by hash, modification or deletion of a given record would require the recalculation and thus modification of the hash values in the metadata of succeeding records.

Thus, linkage by hash in combination with storing hash values of blockchain records by a trusted entity provide a mean for logging any stream of data, that is packetized in payloads of the records of the blockchain. The stream of data can be reassembled from its payload, and by means of linkage by hash the stream of data is protected against later modification, such as content deletions, additions or reordering. This method of protecting data against tamper is transparent; for it to work, it doesn't require an encryption of the metadata or payload for safekeeping. All that is needed is to store the records of the blockchain, including the genesis record, preserving their metadata, payload, and linkage relationship, and the storage of the hash value of at least the last record, generated from metadata and payload, by a trusted entity.

DETAILED DESCRIPTION

As a simple example, assume in FIG. 1 that the payload 14 of each record contains data pertaining to a configuration of sensor devices that measures the concentration of chemicals emitted by an industrial installation. Assume that record B2 contains the result of a measurement that the operator of the installation wishes to conceal or otherwise hide from inspection. The operator might change the payload 14 of record B2 in his data store, but now also would need to change the hash values contained in the following record, hash B2 in record B3. If hash B2 has already been received and stored by an audit service provider or other trusted entity, tamper would be detected. The operator might attempt to replace the payload of B2 with one that: syntactically fits the format of data representation used so far; has the modified value for the measurement; and has the same hash value like the original record, hash B2. In most cases of interest this attempt is impossible or computationally too complex to achieve.

Since the genesis record B1 it is the base of all hash calculations, its strengths in terms of randomness, determined by its size and the quality of the random number generator used to produce it, also determine the difficulty of the challenge to modify a record while preserving its hash value.

A device (e.g. a sensor or control device) that generates an audit blockchain may not have the computational capacity to generate a sufficiently large block of random data. Instead, the device might be equipped with a repository of genesis records, supplied during software install on the device or during manufacturing.

In a preferred method of data audit described in this application, the operator of an installation that produces the content stream 12 in audit blockchain format, as shown in FIG. 1, also forwards the inner metadata of each record to an audit service provider or trusted entity. The inner metadata 18 for a record is also referred to as the payload stripped record associated with that record.

The inner metadata 18 contain at least the hash value of the predecessor record. The inner metadata 18 may contain further information, such as user identifiers in a multi-tenant implementation of the audit system, and information about the topology of an audit blockchain.

A payload stripped representation of a subset of an audit blockchain is the set of data structures made up by the entirety of payload stripped records of the subset. Thus, the topology of the audit blockchain can be reconstructed from it. A payload stripped representation of an audit blockchain is the payload stripped representation of the subset of the audit blockchain that makes up the entire audit blockchain.

Figure 2:
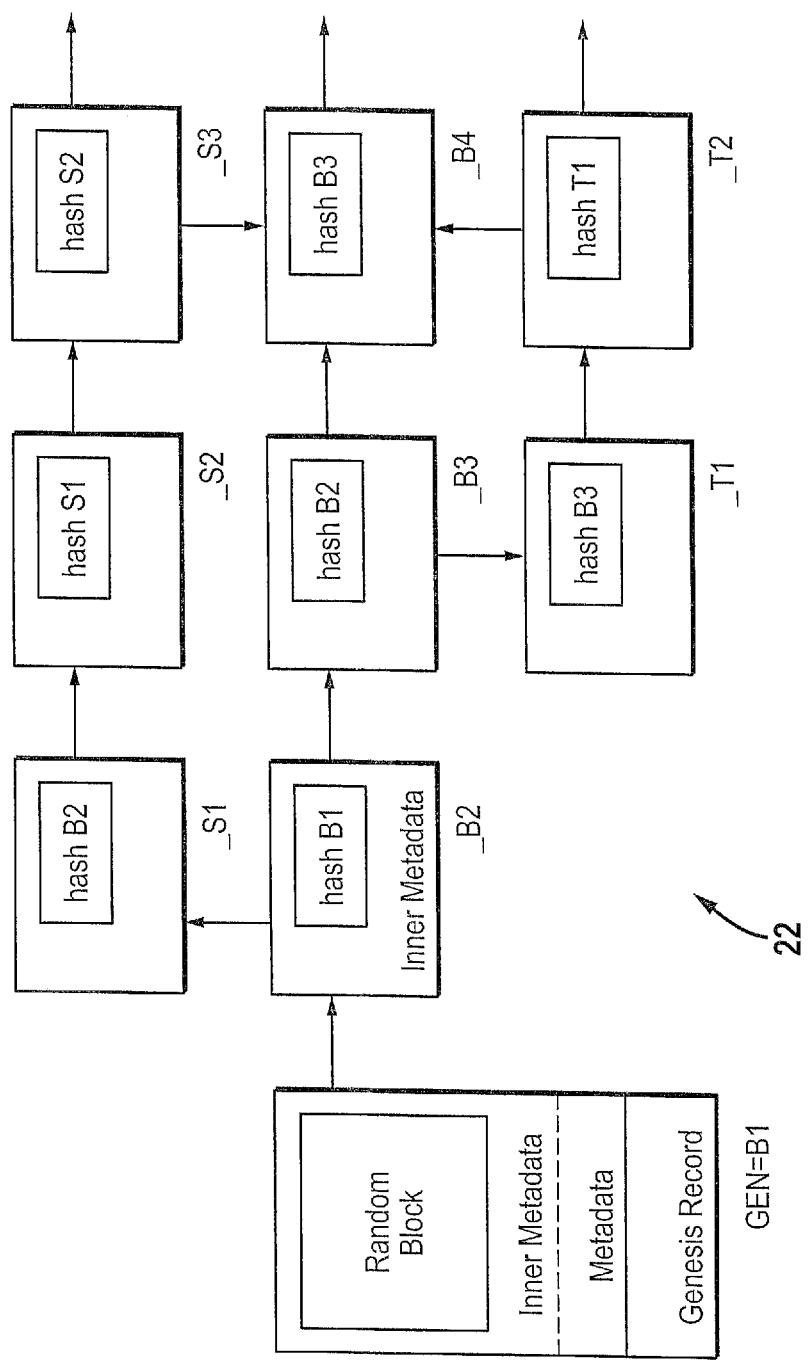
FIG. 2 is a block diagram of a payload stripped stream of records.

FIG. 2 shows the payload stripped representation of the audit blockchain (22) of FIG. 1. Per naming convention, the payload stripped record of a record, B, is denoted with _B. The payload stripped record corresponding to the genesis block at least contains its block of random data and also may contain the inner metadata segment or metadata. In the present application, the audit blockchain of FIG. 1 is referred to as a content stream 12 because it includes a payload 14. The payload stripped representation of an audit blockchain of FIG. 2 is referred to as a payload stripped stream 14 because the payload 14 is not included, but at least a portion of the metadata 16 is included.

To perform an audit for an audit blockchain (e.g. FIG. 1) that is maintained by the operator of an installation, the audit service provider simply compares the hash value of each record of the content stream 12 with the hash value in its corresponding record in the payload stripped representation, payload stripped stream 22 of FIG. 2. If the hash values coincide, the correctness of a given hash value is verified by redoing the hash calculation for the preceding record in the audit blockchain stored by the operator, which should lead to present hash value.

Comparing the content stream 12 shown in FIG. 1 and its payload stripped representation, payload stripped stream 22 in FIG. 2, the audit process would entail to first compare all hash values of corresponding records. For instance, the value hash B1 in the payload stripped stream 22 needs to coincide with the value hash B1 stored in record B2 of the content stream 12 in FIG. 1, and so on. If the test for equality of all pairs of corresponding hash values has been successful, the calculation of hash values is repeated on the content stream 12 maintained by the operator in FIG. 1. I.e., the hash value of the GEN record is calculated by the audit service provider and needs to coincide with the value hash B1 in record B2, the hash value of record B2 is calculated and needs to coincide with hash B2 stored in record B3.

This audit mechanism is tamper proof and for the operator of an audited infrastructure incurs little overhead in managing the data that are subject of auditing. The audit service provider is isolated from the payload of records of the data stream made up by them; all obligations to maintain data security remain with the operator. Moreover, the method is suited for use in a distributed environment, which includes devices with low computational power in insecure locations.

A subchain of an audit blockchain is an ordered set of records linked by hash, i.e., where the hash value of a record stored in the metadata of a given record, is the hash value of an immediate predecessor of that record, that may not necessarily be part of the subchain. A subchain doesn't allow for a record to have multiple predecessors or successors, that belong to the subchain. For instance, in FIG. 1, (B1, B2, B3), or (B1, B2, S1, S2, S3) are subchains, whereas records B1, B2, B3, S1, S2, S3 cannot be arranged to constitute a subchain. A subchain is said to have the linkage by hash property, if for each record, B, of it, there exists a series of records GEN=B_1, . . . , B_n, with B_1=GEN, B_n=B, such that B_i is the immediate predecessor of B_(i+1), and B_(i+1) is linked by hash to to B_i.

Each subchain of an audit blockchain, establishes a subset of the data stream of the audit blockchain, which is a set of data structures presented as payload of the subchain, for which the audit blockchain, by means of its properties, defines an ordering. A subset of an audit blockchain consists of one or more subchains that may have records in common. In particular, a subchain of an audit blockchain is a subset. For instance, the records of the two subchains (B1, B2, B3) and (S1, S2, S3) together constitute a subset, (B1, B2, B3, S1, S2, S3).

A payload stripped representation of a subset of an audit blockchain consists of the set of payload stripped records corresponding to records of the subset, preserving information about the linkage by hash relationship of records of the subset. I.e. in the example of FIG. 1, the payload stripped representation of subchain (B2, B3) is (_B2, _B3). If a subchain contains the genesis record, its payload stripped representation contains it as well. For instance, the payload stripped representation of (B1=GEN, B2, S1) is (GEN, _B2, _S1). The payload stripped representation of a subset of an audit blockchain also is referred to as a payload stripped stream of a subset of an audit blockchain.

A primary blockchain of an audit blockchain is a distinguished subchain that has as first record the origin the genesis block, GEN, and its records, by definition, are declared to belong to the primary chain. A secondary blockchain, S, of a subchain, C, is a subchain whose first record, S1, has as successor a record of C and S1 does not belong to C. C is called the parent chain of the secondary blockchain. A subchain C is a distant parent of S is there is a set of subchains C_1, . . . , C_n such that C_1 is a parent of S, C_(i+1) is a parent of C_i and C is a parent of C_n. Further records of S may also belong to C, to secondary blockchains of S, or to parent chains of S, but to no other chain. A secondary subchain, S, of a subchain, C, is called a child of C if C contains a record, C1, that is the immediate predecessor of the first record of S. A subchain, S, is called a remote child of C, if there is a set of subchains C_1, ..., C_n such that C_1 is a child of C, C_(i+1) is a child of C_i and S is a child of C_n.

A primary or secondary blockchain in its payload typically contains a subset of the data stream of the audit blockchain, chosen towards assembling data for a specific purpose. For instance, a primary or secondary blockchain may be designated to contain in its payload the content of log files of a set of daemons, to inform about that set of daemons, or in addition to the former, also the output of periodically run commands that display the status of components of the operating system, to gather further information that affect the performance of that set of daemons.

In the present application, the term "device" is used to denote any hardware or software component capable of producing a content stream. Sometimes, "edge, peripheral, control and sensor" devices are specifically referred to as examples—all are types of devices and their categorization overlap. Peripheral devices, management infrastructures, escrow services, and optionally network edge devices participate in a distributed implementation of a blockchain based audit mechanism. For instance, a peripheral computing device will send data that are designated for a possible later audit in blockchain format, and the management infrastructure will store them preserving the blockchain format. The distributed implementation of a blockchain based audit mechanism may include firmware functions, kernel threads, and middleware and application processes.

Many devices, such as a peripheral device typically operates under resource constraints, i.e. limited energy, network bandwidth, and storage capacity, and may not be able to send all data it generated, or cache them for later transmission. An example would be sensor devices that generate environmental data in response of an event, causing burst like data collections and network traffic. If buffering capacities for a given device are exceeded, a subset of the data stream needs to be discarded and thus records of the blockchain that contain this subset of data stream need to be dropped.

A secondary blockchain may be terminated for several reasons, such as no further data are generated for the subset of the data stream associated with it, data in its subset of the data stream have gone stale and are no longer required, or the resources used by it, such as buffer space, need to be released.

By design, a primary blockchain will never be terminated to ensure continuity of linkage by hash to the GEN record. This allows for starting a new secondary blockchain at any point, and ensures validity of its associated data stream. Since the predecessor of the first record of a secondary chain is linked by hash to the GEN record, all further records of the secondary chain are. The purpose of secondary blockchains is to enable processing subsets of the data stream of an audit blockchain concurrently, with little or no coordination between them, and the ability to terminate the processing a subset, if needed. A secondary blockchain may be associated with a data collection for a specific component, task, or user, the data stream typically having its own encryption. A secondary blockchain may go on indefinitely.

Figure 3:
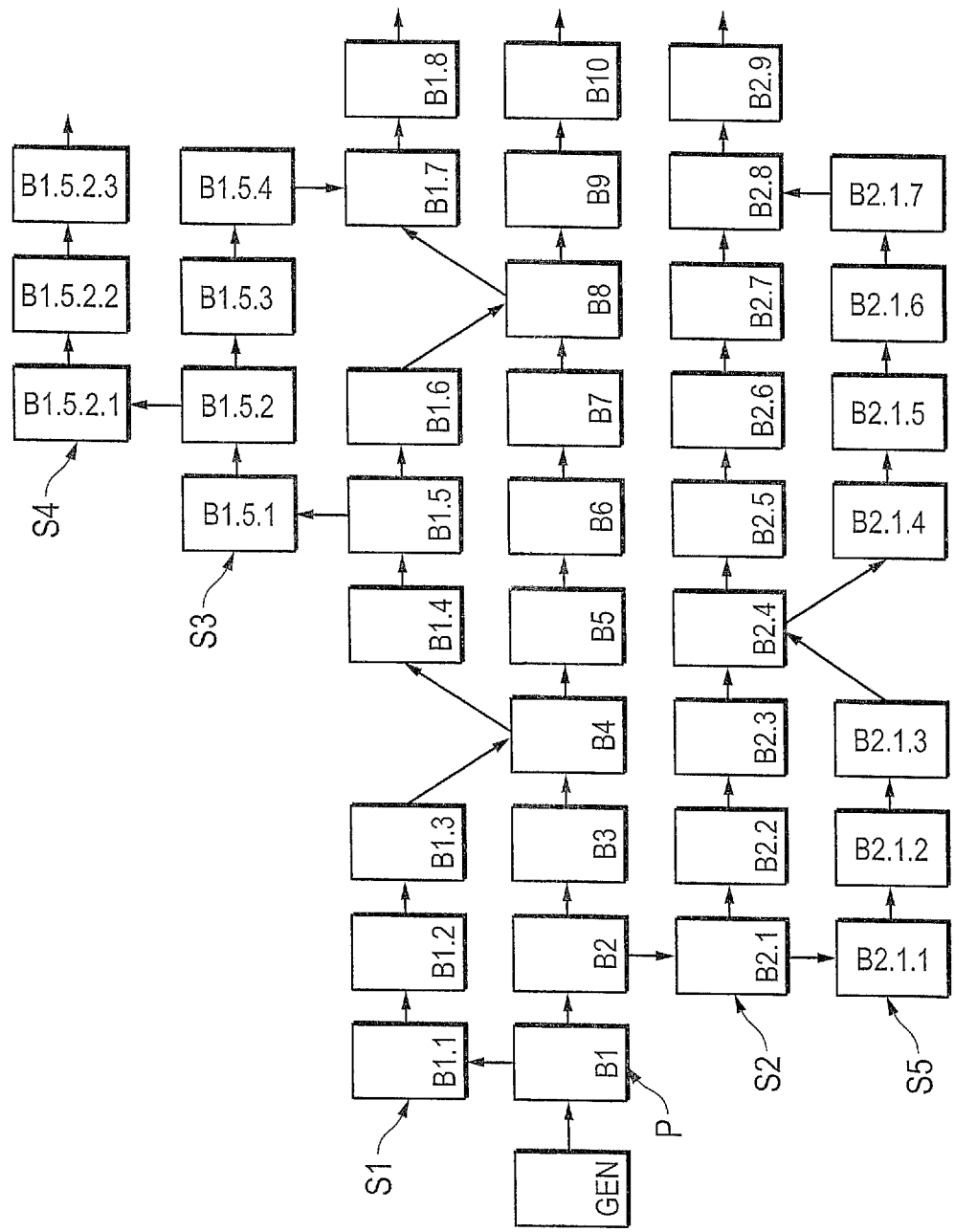
FIG. 3 is a block diagram of a blockchain showing an exemplary relationship of a primary chain and secondary chains.

FIG. 3 shows an example of a subset of an audit blockchain. The primary blockchain is P=(GEN, ..., B1, ..., B10, ...). It has two secondary chains, S1=(B1.1, B1.2, B1.3, B4, B1.4, B1.5, B1.6, B8, B1.7, B1.8, ...) and S2=(B2.1, ..., B2.9, ...). S1 has secondary blockchain S3=(B1.5.1, ..., B1.5.4) and S4=(B1.5.2.1, ..., B1.5.2.3, ...). S2 has secondary blockchain S5=(B2.1.1, B2.1.2, B2.1.3, B2.4, B2.1.4, B2.1.5, B2.1.6, B2.1.7). The predecessor of record B1.1 is B1, and B1.1 and B1 are linked by hash, which ensures linkage by hash for all records of S1, analogously for the other secondary blockchains. The predecessor of B2.1.1 is B2.1, and the two are linked by hash. Since linkage by hash is guaranteed for B2.1, it is as well guaranteed for S5. Records B1, B1.5, B1.5.2, B2, and B2.1 are fork records, as discussed infra.

A secondary chain may for instance be produced by any hardware or software component of a device. A purpose of the primary chain, as explained in conjunction with FIG. 1, is to maintain blockchain continuity; it cannot be abandoned due to resource shortages. The payload may contain general health and status data about the device. Consider, for example, a sensor device, such as a magnetic sensor in conjunction with FIG. 3. Secondary chain S2 may contain the data stream generated by the magnetic sensor, which for instance registers movements of mechanical parts. The magnetic sensor may fulfill its task in conjunction with a pressure sensor, whose data stream is represented by subchain S5. When the latter sensor measures a value that is outside a given range, a time wise correlation of the data streams represented by S2 and S5 may be forced by generating a record that is common to S2 and S5.

In more detail, the pressure sensor may detect a value outside a given range and adds logging data to record B2.1.3. Afterwards record B2.4 is generated on chain S2, which has as predecessors both B2.3 and B2.1.3. I.e. B2.4 contains the hash values of both, B2.3 and B2.1.3. B2.4 is called a synchronization record for subchain S5. The payload of record B2.1.4 contains further measurements by the pressure sensor. The established time wise correlation is that measurements represented by record B2.1.3 occurred before the ones represented by B2.5. and likewise the ones represented by B2.3 before B2.1.4. Linkage of records by hash ensures that this time wise correlation cannot be changed afterwards. Secondary chain S5 ends with record B2.1.7, and the termination of this subchain is explicitly noted by including the hash value of B2.1.7 into B2.8. B2.8 is called a join record (discussed infra). Later on, a new subchain of S2 may be generated. Another secondary chain of the primary chain is S1, which may correspond to the measurements of another sensor. It contains synchronization records B4 and B8. A measurement or state recorded by B1.5 may trigger another action, such as diagnostic data collection, that is captured by secondary chain S3, whose termination is logged by join record B1.7. The diagnostics data collection may entail capturing a binary dump, to be sent as payload of secondary chain S4. Sending the binary dump may a best effort, depending on resource availability. No time wise correlation of records of S4 with another chain is required and processing of records of it may be abandoned. In the example of audit blockchain given in FIG. 3, S4 has not been terminated by the time its parent chain has. S4 later on may be explicitly terminated by linking its last element to a join record on subchain S1 or on the primary chain. In another example, S5 may represent a data stream for which it is desirable to establish synchronization with subchains other than S2. In this case, S5 may contain a synchronization record that belongs to S1 or the primary chain.

An audit blockchain may coordinate the actions of devices (e.g. peripheral devices) to establish an order between them. For instance, a distributed protocol that is run by multiple devices connected by a network, may establish a global order of events or actions performed by the set of devices by adding communication performed in the course of executing a given protocol to an audit blockchain.

Figure 4:
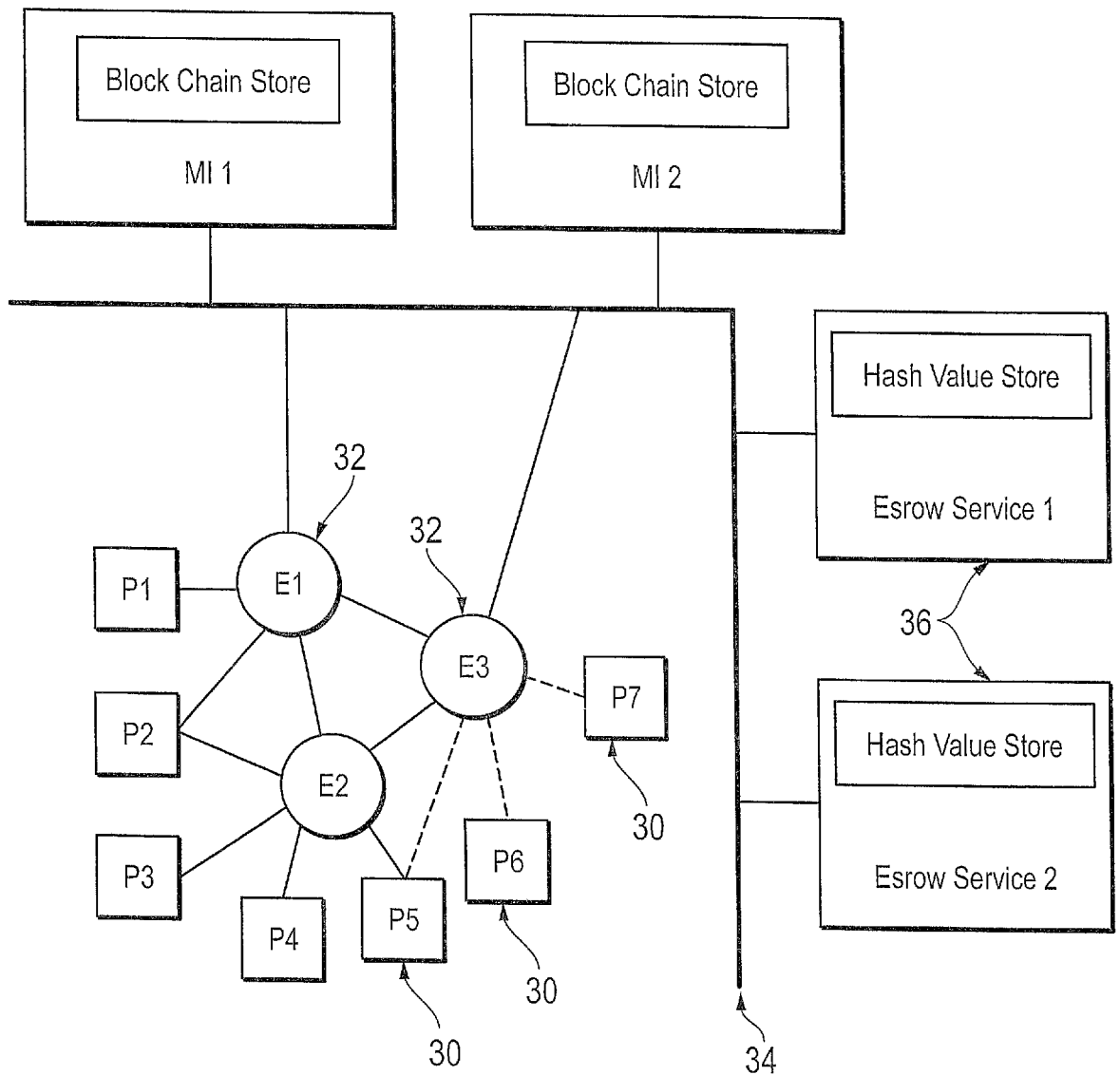
FIG. 4 is a block diagram of a computing infrastructure.

FIG. 4 shows as an example of a computing infrastructure implementing one method of blockchain based auditing in accordance with the present invention. Seven peripheral computing devices 30 (P1, . . . , P7) are shown. The devices 30 communicate by means of a network that typically include edge devices and gateways 32 (E1, . . . , E3) with one or more management infrastructures, M1, M2. In addition, one or more escrow services 36 exist, which, to provide an auditing service, communicate with the management infrastructure and possibly with peripheral computing devices 30.

Peripheral devices 30, management infrastructures M1, M2, escrow services 36, and optionally network edge devices 32 participate in a distributed implementation of a blockchain based audit mechanism. For instance, a peripheral computing device 30 will send data that are designated for a possible later audit in blockchain format, and the management infrastructure M1, M2 will store them preserving the blockchain format. The distributed implementation of a blockchain based audit mechanism may include firmware functions, kernel threads, and middleware and application processes.

Examples of devices generally, and in particular peripheral devices are sensor devices in Internet of Things, IoT, installations, controllers in industrial equipment, such as robotics components, smartphones, tablets, wearable devices, controllers of medical equipment, controllers or devices for communication in cars, or servers, or virtualizations of all aforementioned. A peripheral device is capable of network communication, and typically equipped with at least one network device, such as for WiFi, LTE, Ethernet, ZigBee, ATM, ISDN, USB, Bluetooth or others. The edge devices in their entirety may support multiple protocols. For instance, in FIG. 4 edge devices E1 and E2 may be LTE routers or gateways, whereas E3 is a gateway that supports LTE and ZigBee. Devices P1, . . . , P4 have an LTE module and communicate with E1 or E2, whereas device P5 has two network modules, one for LTE and one for ZigBee, and thus is capable to communicate with E2 and E3. Devices P6 and P7 have a ZigBee module and are capable of communicating with E3.

The management infrastructure (M1, M2 in FIG. 4) is a computing system, consisting of one or more programs that run on a set or servers, to administer and record the actions of the peripheral computing devices 30. Management infrastructure implements the administration of such devices 30, which may include role based access in a multi-tenant setup, coordinated actions of multiple devices to perform tasks they were designed for and to perform diagnostics and maintenance, such as monitoring device health and software or firmware upgrades. The management infrastructure is capable of producing content streams, for the purpose of generating audit data pertaining to the interaction of it with the devices it manages.

A set of peripheral computing devices may be administered by multiple management infrastructures. It is up to the design of such setup to ensure that no conflicts exist in access and management of the peripheral computing devices.

A management infrastructure may also include a history service, a component that provides for the management of logging data that were sent by the peripheral computing devices under its management, or data that were generated by the management infrastructure in the course of its operation. Examples of such data include:

1. Data generated by a peripheral computing device in the course of its designed operation, such as measurement data collected by sensors, logging information about movements a robotics component takes, or state information generated by a controller associated with a sensor (e.g. pressure valve).
2. Information about the operational state of the peripheral computing device, such as logging information generated by its firmware, operating system or applications. Examples are error logs, device state information, such as network statistics or battery state, or information about transitions between boot, shutdown and hibernate states of the device.
3. Information generated by the management infrastructure in the course of the administration of the peripheral sensor devices, such as scheduled coordinated actions of the former, or requests for data transmission.
4. Information observed about the state of the computing infrastructure, such as diagnostics information for the network infrastructure, or the state of peripheral computing devices as observable by the management infrastructure.

The history service provides for the management of above data in blockchain format, most importantly the following functions:

1. Storing blockchains in a database, the Blockchain Store, which is a database that provides for persistent storage, including backups, and query functions.
2. Management of blockchains, including storing them in a format that preserves topology and hash values, query functions to retrieve chains or subchains, and functions to extract their payload from records and reassemble it. Management functions support multi-tenancy and role based access.

An escrow service (sometimes a trusted entity is referred to as an escrow service) is a computing infrastructure that implements the functions of the audit scheme described by this invention, that are performed by the audit service provider. An escrow service has two main functions:

1. Store payload stripped representations of blockchains, forwarded to it by peripheral devices and management infrastructures, in a database, the Hash Value Store—it provides for persistent storage, data backup and query functions.
2. Service audit requests for data generated in the course of the operation of the peripheral devices and management infrastructures. This entails validating blockchains stored by the management infrastructure for correctness and verifying that the metadata of a given such blockchain coincide with the ones in the corresponding blockchain stored in the Hash Value Store.

FIG. 4 shows two escrow services, Escrow Service 1 and Escrow Service 2. Each escrow service may provide audit services on behalf of its own set of one or more audit service providers, for a content stream that is stored in the Blockchain Store of management infrastructure M1 or M2.

The management infrastructure and escrow service both contain components for their databases, Blockchain Store and Hash Value Store respectively, and access to them to be continuously available, for instance by means of clustering and scalable proxies. For instance, in FIG. 4, each management service, M1 and M2, and likewise each escrow service, Escrow Service 1 and Escrow Service 2, may be clustered, i.e. be active on multiple servers, that run the processes and threads required to perform its services in coordination.

Figure 5:
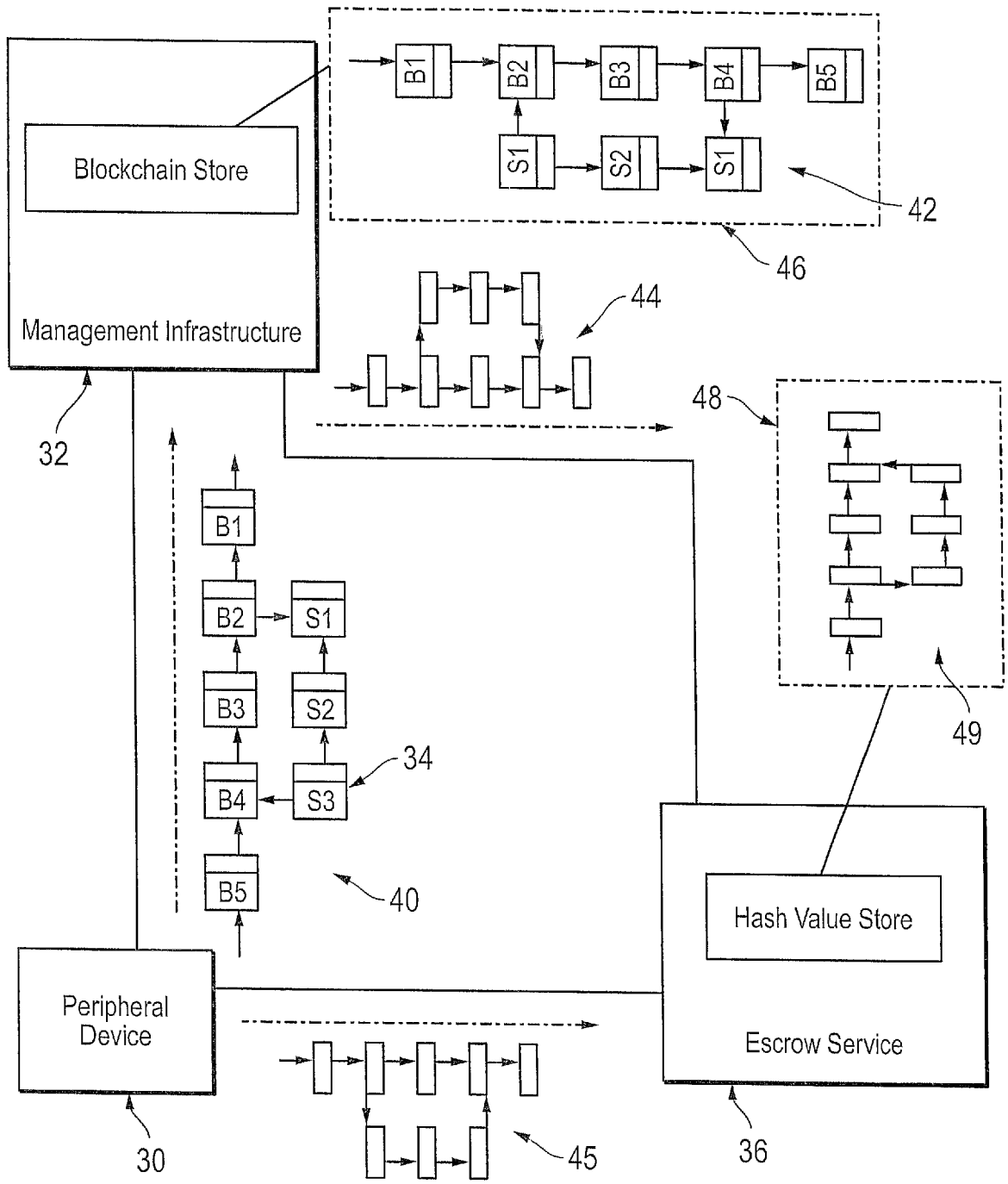
FIG. 5 is a block diagram showing the interaction of devices.

FIG. 5 shows a minimal configuration to illustrate the cooperation of components described above and in conjunction with FIG. 4 to implement one proposed method for auditing in accordance with the present invention. FIG. 5 shows one management infrastructure (number), which may be either M1 or M2 in FIG. 4, and one escrow service, which may be either Escrow Service 1 or Escrow Service 2 in FIG. 4.

In FIG. 5, the peripheral device 30 creates an audit blockchain that contains the data stream generated by processes and threads active on the peripheral device to be saved for auditing, by chunking the data stream and adding each chunk as a payload to a blockchain record. In parallel, sets of records of the blockchain are forwarded to the management infrastructure (32). FIG. 4 shows a subset of a blockchain (40), consisting of records B1, . . . , B5, S1, . . . , S3 being forwarded to the management infrastructure. In case the peripheral device 30 cannot establish a network connection with the management infrastructure 40, subsets of the blockchain are buffered on the peripheral device. Records of the primary blockchain (subset of blockchain 40, here B1, . . . , B5), always have precedence in transmission. The inner metadata segment of a record is shown. For instance, for record S3, the inner metadata segment is 34.

In FIG. 5 the management infrastructure 32, upon receipt of records of the blockchain sent by the peripheral computing device 30, possibly out of order due to network latencies and thus buffered on the management infrastructure 32, adds them to the copy of the blockchain 42 in its Blockchain Store 46, preserving the topology given by linkage by hash.

As subsets of the blockchain are forwarded from the peripheral computing devices 30 to the management infrastructure 32, in parallel payload stripped representations of these subsets (often referred to herein as subsets of payload stripped stream of data records) are forwarded to the escrow service 36, by the peripheral computing device 30, the management infrastructure 32, or both. 45 is the payload stripped representation of the subset of the blockchain 40 forwarded by the peripheral computing device 30 and 44 the payload stripped representation of the subset of the blockchain 40 forwarded by the management infrastructure 32.

The escrow service 36, upon receipt of the subset of the payload stripped stream 44 or 45 adds them to the payload stripped stream 49 that is maintains for the audit blockchain, in its Hash Value store 48, preserving the topology given by the linkage of records. Thus, a blockchain constructed by a peripheral device 30 has information about it stored in two locations, a copy of it (content stream 42) in the Blockchain Store 44 and a payload stripped representation of it (payload stripped stream 46) in the Hash Value Store 48.

An audit of a data stream stored as payload of records of an audit blockchain in one form entails the following steps:
1. An escrow service 36 receives the audit request for the blockchain (content stream 42 in the Blockchain Store 44) and retrieves its payload stripped representation of it (payload stripped stream 49) from the Hash Value Store 48.
2. The escrow service 36 sends a request to the management infrastructure 32 for a copy of the blockchain that is subject of the audit and creates a payload stripped representation of it, as at 48.
3. The escrow service 36 performs a comparison of the two payload stripped representations of the blockchain, the payload stripped stream 42 retrieved from the Hash Value Store (step 1) and the one created from the audit blockchain stored in the Blockchain Store 46. They need to match with regards to record content and topology of the subset.
4. If the test performed in step 3. passed, or at least for a set of maximal subchain of the payload stripped streams, starting at the genesis record, a verification of hash values will be performed for the corresponding subchains of the copy of the blockchain 42 in the Blockchain Store 44. I.e., for each such subchain of the set of maximal subchains that passed verification, starting with the genesis block (not shown in 42), hash values of records are recalculated consecutively. For instance, for records B2 and B3 stored in 42, B2 being the predecessor of B3, it is verified that the calculated hash value of B2, coincides with the one stored in the metadata of B3.

A subchain is considered correct, if linkage by hash can be proven. I.e., for each record of it, B, there exists a subchain $GEN=B\_1, \ldots, B\_n=B$, whereby $B\_i$ is a predecessor of $B\_(i+1)$ and the hash value of the predecessor record, stored in the inner metadata segment of $B\_(i+1)$, coincides with the hash value calculated of $B\_i$.

The design for data collection and the method of audit have the following advantages:
1. The Escrow Service 36 does not need to store a copy of the blockchain, which includes the payload of each record of it (payload 14 in FIG. 1). Obligations for data security fall to the operator of the management infrastructure alone.
2. The Escrow Service 36 can be isolated from accessing the payload during processing the audit process. An implementation of this may include a Trusted Platform Module, TPM, or other hardware based encryption.
3. The metadata (16 and 18 in FIG. 1) may contain further information to enable audit services for clients that have access privileges for subsets of data of a blockchain. For instance, metadata may contain client IDs or encryption keys, to read the payload.

An audit blockchain, aside being stored in the Blockchain Store 48, may also be inserted into a public blockchain, similar to Bitcoin, or other trusted escrow methods, included a printed copy in a bank vault.

The architecture for an audit system described above can be used for any computing setup, including at least two machines (such as the examples of "devices" above), assuming sufficient computational capacity. One machine would assume the role of an escrow server. A second machine may do both, produce the data stream and perform the functions of the management infrastructure, or further machines may exist for every of the two aforementioned functions.

Generally speaking, "Linkage by hash" refers to the protection of a subset of an audit blockchain that starts with the GEN record, its set of records, their content and topological relationship, from modification as provided by the linkage function. The linkage function may be simple or complex, but would usually be more complex than a simple calculation of a cryptographic hash of a predecessor record. The hash value stored in a record would often be a value calculated by means of a linkage function.

The linkage function needs to be such that a given value, X, which is the result of its application to a set of argument records, B1, . . . , Bn, cannot be arrived at for another set of records, C1, . . . , Cn, which differ from former set, B1, . . . , Bn, or determining such set of records for which the linkage function calculates the same result is of such computational difficulty, that it cannot be achieved within a time frame that would be practical or relevant in an attempt to tamper with the data presented by the subset of the audit chain. The value a linkage function calculates may be any number, such as a hexadecimal number, of any length, or more generally any data structure of fixed or variable size that may contain any value, given in binary or other representation.

The linkage function may take as arguments multiple immediate or distant predecessor records. It may perform a combination of operations on that set of argument records, including cryptographic hash calculations, bitwise logical operations, or the calculation of nonces.

The linkage function may change throughout the lifetime of the blockchain, in an agreed upon manner by at least the entities that cooperatively manage an audit blockchain, as described in FIG. 4 and accompanying text, have knowledge; for example, at least the producer and the Escrow Service. The purpose of changing the linkage function is to increase the cryptographic strength of linkage by hash. With repeating traffic pattern, the randomness of hash values stored in records may decline, lowering the computational challenge that needs to be overcome to modify records in a chain while maintaining linkage by hash.

The linkage function may be changed periodically according to a protocol that is at least known to the producer of the audit blockchain and the Escrow Service. For instance, the linkage function may change in an agreed upon manner, known to the producer and the Escrow Service, if the timestamp in a record has passed a given date, if the serial number of a record is larger than a given number, or if a set of consecutive records of an audit blockchain fulfills a certain property. The linkage function may be changed, taking into account the state of multiple payload stripped streams. For instance, consider FIG. 4, showing devices P1, . . . , P7, that all are managed by the same Escrow Service. The Escrow Service may calculate a data segment based on sets of payload stripped records, each set obtained from the payload stripped stream of a device in P1, . . . , P7. The data segment may be built for example by concatenating all hash values extracted from records belonging to aforementioned sets. The Escrow Service then may broadcast that data segment to all devices, P1, . . . , P7, together with instructions how to incorporate it into the calculations of hash values on a given device. For instance, a device may be instructed to build the hash value of a record by performing a bitwise operation taking as arguments that record and the data segment sent by the Escrow Server, and apply a linkage function to the record resulting from that bitwise operation.

A record of a payload stripped stream may contain information to identify the linkage function used to generate the hash value contained in that record. For instance, the device may add information about how the hash contained in given record has been calculated to the inner metadata of that record, which will be preserved in payload stripped record. During audit, to perform the steps in 5.5, the Escrow Service would use that information to identify the linkage function to use to calculate the hash value in a record.

Each primary or secondary subchain may have its own linkage function defined.

To implement independent data streams, for instance in a multi-tenancy configuration, a device might maintain multiple, independent audit blockchains, each starting with its own GEN record. For each independent data stream a dedicated encryption, hashing algorithms, Blockchain Store or escrow services may exist.

FIG. 6.a shows an example of a primary subchain P=(GEN, . . . , B1, . . . , B7) and two secondary subchains, S1=(B2.1, B2.2, B2.3) and S2=(B4.1, B4.2, B4.3). For each record, the inner metadata segment is marked by the dotted area as at 50. The hash value result of a calculation by means of a linkage function is shown as at 52. For instance, the hash value 52 stored in record B4 is h_b4, which has been calculated by means of a linkage function that takes as argument records that precede B4, for instance B3, B2, and GEN. Further, the inner metadata segment 50 shows markers for blockchain control, for example FORK or JOIN in records B4 or B5 respectively.

A fork record is a record (e.g. records B2 and B4 in FIG. 6.a) that contains the FORK marker in its metadata. The FORK marker denotes the start of a secondary chain. In addition to the FORK marker, the metadata of a fork record also contains an identifier for the secondary chain. This may be for instance a unique identifier for the secondary chain, or its first record. In FIG. 6.a, record B2 has a FORK marker for secondary chain S1. It may contain record ID B2.1 associated with the FORK marker, or another unique ID for S1. Similarly, B4 is a fork record for S2. A FORK marker in conjunction with an identifier for a secondary chain establishes an additional successor for that record. For instance, B2 has successors B3 and B2.1.

A join record is a record (e.g. records B5 and B6 in FIG. 6.a) that contains the JOIN marker in its metadata. The join marker denotes the end of a secondary chain. In addition to the JOIN marker, the metadata of a join record also contain an identifier for the secondary chain. This may be for instance a unique identifier for the secondary chain, or its first record. In FIG. 6a, record B5 has a JOIN marker for secondary chain S1. It may contain record ID B2.1 associated with the JOIN marker, or another unique ID for S1. Similarly, B6 is a join record for S2. A JOIN marker in conjunction with an identifier for a secondary chain establishes an additional predecessor for that record. For instance, B5 has predecessors B4 and B2.3.

As already described and illustrated in FIG. 3, a secondary chain can start a further secondary chain, i.e. a record of secondary chain may be a fork or join record. A record can have multiple markers, each of type FORK or JOIN, and each associated with an ID of a secondary chain.

For a given join record, the hash value is built using the predecessor record that belongs to the same chain like the join record. For instance, in record B5, h_b5=hash B4. In FIG. 3, the hash value stored in record B2.8 is calculated from record B2.7.

The linkage function that calculates the hash value for a given record, may take as arguments any set of records that are predecessors. For instance, in FIG. 6.a, the hash value of the first record in subchain S2, h_b4.1, may be calculated using a linkage function applied to arguments B4, B3, B1, GEN.

To reduce the complexity of auditing, the management of audit blockchains, and functions such as multi-tenancy, a secondary blockchain may start with its own genesis record, the secondary genesis record. It is assumed to be of sufficient cryptographic strength, i.e., of sufficient size and randomness. It may be arrived at by applying a linkage function to the GEN record and a set of predecessor records of a given record. In FIG. 6.a, the first record of secondary chain S2, record B4.1, contains secondary genesis record G_B4.1 in its metadata, which may for instance be calculated by means of a linkage function, taking as arguments the predecessor records B4, B2, B1, and GEN. Alternatively, a secondary genesis record may come from a repository of genesis records.

To establish linkage by hash with its predecessor record, the metadata of the first record of a secondary chain may as well contain the hash value arrived at as a result of a linkage function applied to a set of predecessor records. For instance, in FIG. 6.a, the secondary genesis record of secondary chain S1, G_B2.1, may be a genesis record from the genesis record repository of the device. To establish linkage by hash for S1, the metadata of its first record in addition contain hash value b_b2.1, which has been calculated by means of a linkage function taking as argument record B2. Record B4.1 contains, in addition to secondary genesis record G_B4.1, hash value h_b4.1. It is not strictly required to establish linkage by hash for B4.1, since G_B4.1 already has been obtained by means of a linkage function. The second hash value, h_b4.1, may be used for convenience, in the implementation of management functions for the audit blockchain.

A secondary chain may as well contain a finalization record, having the marker FIN in its metadata. Such record may be used to mark the end of a secondary chain, such as when the data stream, for which the secondary chain had been created, has terminated, and thus the secondary chain is no longer required to maintain. In FIG. 6.a, records B2.3 and B4.3 and finalization records.

FIG. 6.b shows the payload stripped stream of the blockchain of FIG. 6.a, as it may be stored in the Hash Value Store of an Escrow Service. The payload stripped stream of data records 60 is made up of records corresponding inner metadata segments and their topological relationship. The inner metadata of the primary chain may contain identifiers of secondary chains associated with a FORK or JOIN marker or the attachment of a secondary chain may be reconstructed from that information. Alternatively, the blockchain control data of a record, segment BC Control in FIG. 1, may contain information to reconstruct the blockchain topology. The BC Control may be used by the Escrow Service to augment the payload stripped representation of the audit blockchain with topological information. As explained, segment BC Control contains helper data to facilitate the efficient processing of audit blockchains, as subsets of it are forwarded between components. They are not essential in the data model of an audit blockchain to provide its crucial properties; they do not need to be preserved in a copy of a blockchain in the Blockchain Store, or its corresponding payload stripped stream in a Hash Value store.

In the depiction of the payload stripped stream 60 (payload stripped representation of a blockchain in FIG. 6.b), the topological relationship between the primary chain P and secondary chains is represented by arrows that connect secondary chains S1, and S2 to primary chain. In the implementation of a Hash Value Store, topological relationships would be represented by linked lists or similar.

A secondary chain of a subchain may be linked to that subchain to establish a 'happened before' relationship between two sets of records, each belonging to one subchain, by means of a synchronization record, as shown in FIGS. 7.a and 7.b. A 'happens before' relationship for a pair of subchains, [S1, S2], exists, if every record in S1 has been created before a record in S2. Subchains S1 and S2 do not belong to the same secondary chain. A synchronization record is a mean to establish a time wise correlation between records belonging to subchains that would not have a time wise correlation otherwise. FIG. 7.a shows a subchain of a primary blockchain P (B1, . . . , B7), and a subchain of a secondary chain, S1=(B2.1, B2.2, B2.3, B5, . . . , B2.4, B2.5), having B2 as fork record. The secondary chain may terminate at a later point or go on indefinitely. It contains record B5, a local synchronization record, which establishes a 'happens before' relationship between sets of records that belong to the same audit blockchain, i.e. have linkage by hash to the same GEN record. A local synchronization record has a SYN_L marker. A SYN_L marker of a record, B, has identifiers of two records associated with it, that belong to a secondary blockchain of a subchain to which B belongs. Record B then as well belongs to that secondary subchain. In the example of FIG. 7.a, B corresponds to B5, and the secondary chain to S1. Synchronization record B5 establishes 'happens before' relationship between two pairs of subchains, [(B1, . . . , B4), (B2.4, B2.5)] and [(B2.1, . . . , B2.3) and (B6, B7)].

FIG. 7.b shows the payload stripped stream of data records (payload stripped representation of the subset of the blockchain of FIG. 7.a), as it may be stored in the Hash Value Store of an Escrow Service. The payload stripped stream of data records is made up of records corresponding inner metadata segments and their topological relationship.

A "happens before" relationship can as well be defined between subchains that do not belong to the same audit blockchain. I.e., the genesis record to which records of the first subchain are linked by hash is different from the genesis record, to which records belonging to the second subchain are linked by hash.

FIG. 8.a shows the same two subchains like FIG. 7.a. In FIG. 7.a record B5, in addition to being a local synchronization record, is also a remote synchronization record, which establishes a 'happens before' relationship between sets of records that do not belong to the same audit blockchain. That second blockchain is not shown. A record may have the SYN_R marker added on it on the device that produces the blockchain. For instance, multiple blockchains may be produced on a peripheral device, as shown on FIG. 4, for instance peripheral device P1. One blockchain is generated by program P1, another one by program P2. P1, upon receiving an event in its data stream, captured by secondary chain PS1, communicates with P2 to establish a 'happens before' relationship between records of PS1 and a secondary chain, PS2, managed by P2. Program P2, upon notification from P1, generates a remote synchronization record, here B5, and forwards a unique identifier of that record to device P1, which includes it into secondary chain PS1.

A record may be concurrently a fork, join, local and remote synchronization record. I.e., a record may contain multiple markers of the following type: FORK, JOIN, SYN_L, SYN_R. A fork or join record as well establish a 'happens before' relationships. For instance, in FIG. 6.a fork record B4 establishes a happens before relationship between subchains (GEN, . . . , B1, B2, B3, B4) and (B4.1, B4.2, B4.3). Likewise, join record B5 establishes a 'happens before' relationship between subchains (B2.1, B2.2, B2.3) and (B6, B7).

Figure 9:
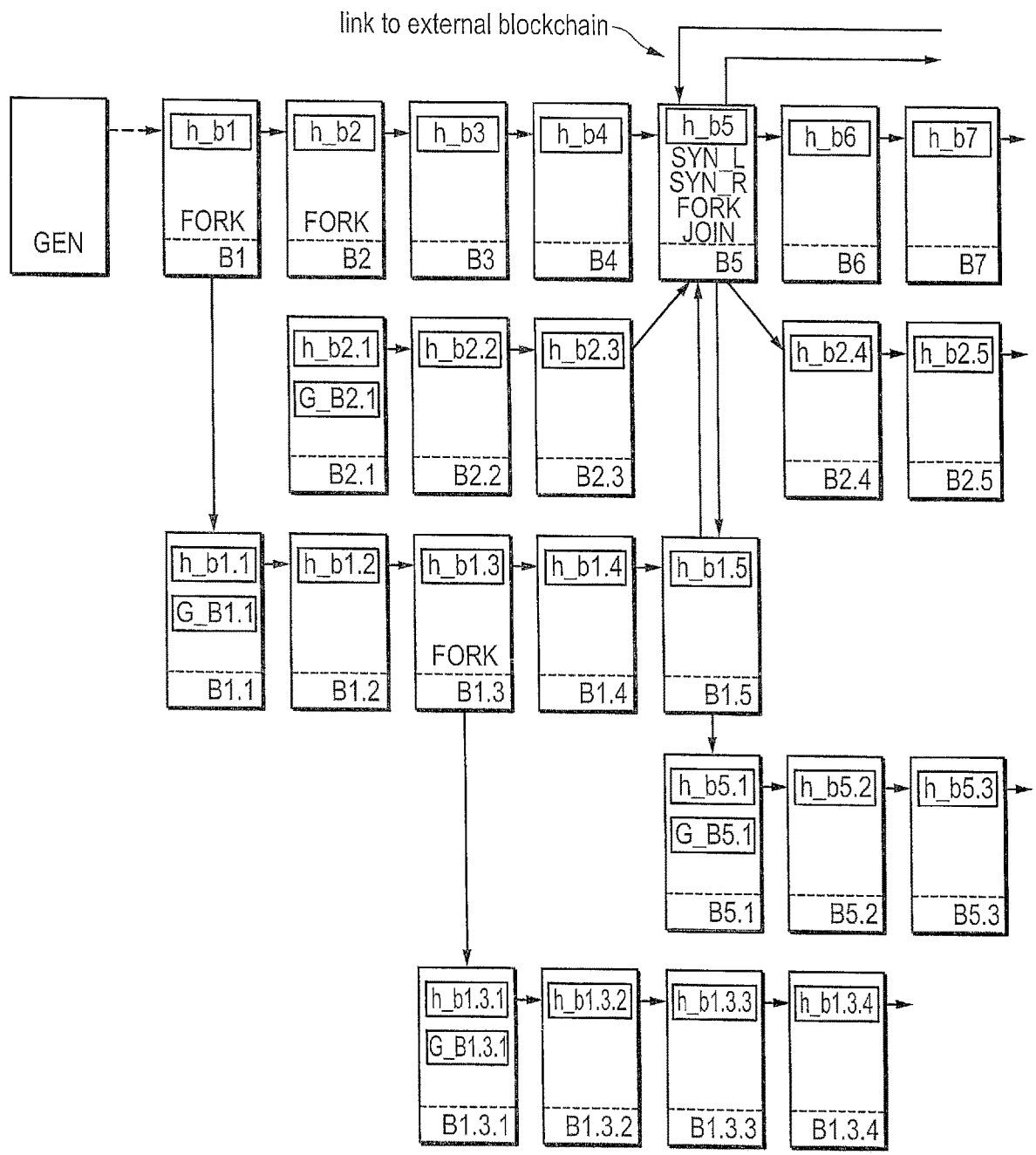
FIG. 9 is a block diagram of a subset of a blockchain having a content stream of records showing primary and secondary chains.

FIG. 9 shows a subset of a content stream of records consisting of primary chain P=(GEN, B1, . . . , B7) and secondary chains S1=(B2.1, B2.2, B2.3, B5, B2.4, B2.5), S2=(B1.1, B1.2, B1.3, B1.4, B1.5), S3=(B1.3.1, B1.3.2, B1.3.3, B1.3.4, . . . ) and S4=(B5.1, B5.2, B5.3, . . . ). Record B2 has a FORK marker for S1, B1 for S2, B1.3 for S3 and B5 for S4. Record B5 also has a JOIN marker for secondary chain S2. Record B5 establishes a 'happens before' relationship for multiple pairs of subchains, among others between (GEN, . . . , B4) and (B5.1, B5.2, B5.3), between (B2.1, B2.2, B2.3) and (B5.1, B5.2, B5.3), and between (B1.1, . . . , B1.5) and (B6, B7).

Figure 10:
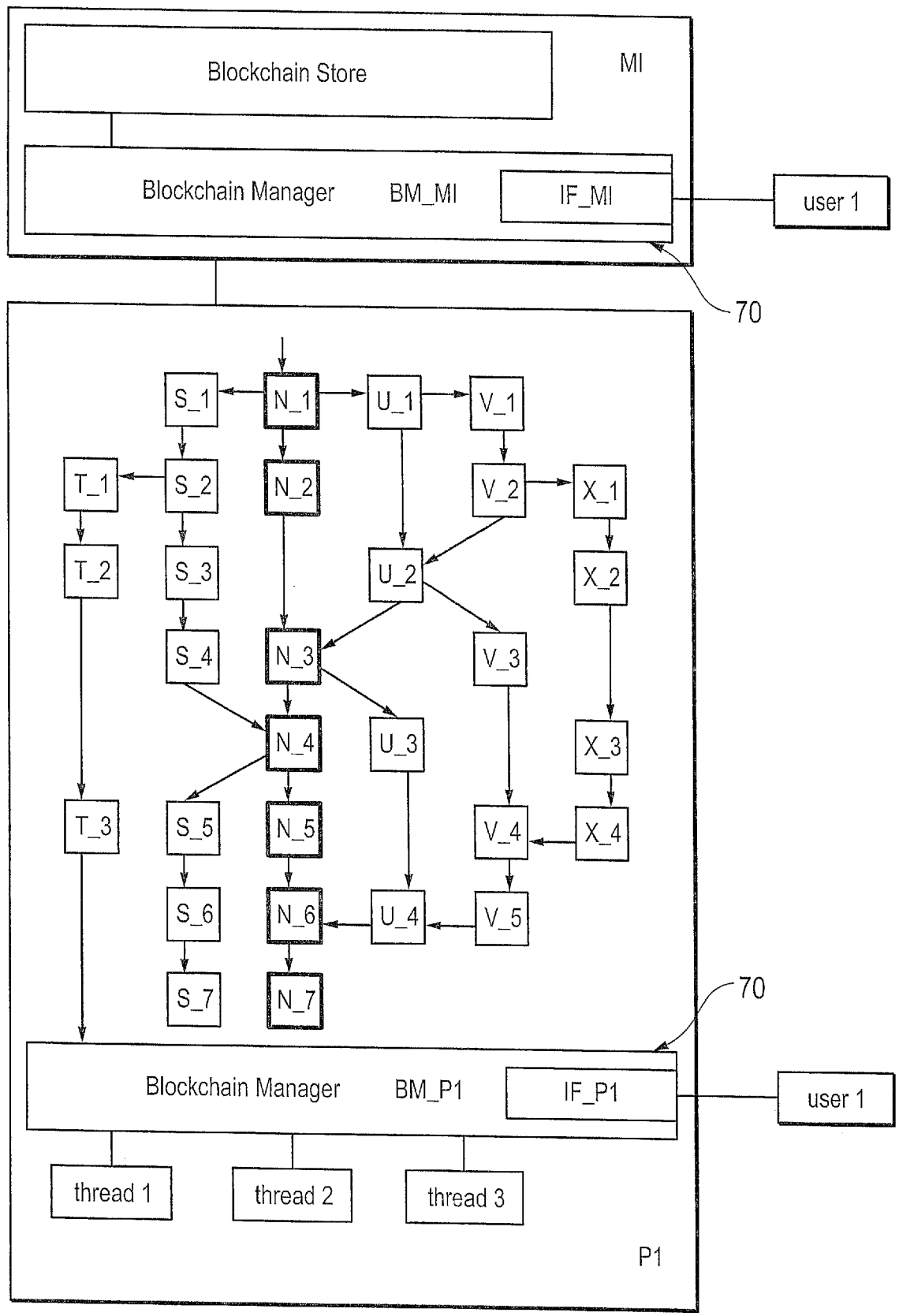
FIG. 10 is a block diagram of the interaction of components in transferring records from a peripheral device to a management infrastructure.

FIG. 10 shows a configuration consisting of a peripheral device P1, and a management infrastructure, MI. The Blockchain Manager 70 is a distributed infrastructure for the management of content streams of records. Blockchain Manager 70 consists of two components, BM_MI, active on management infrastructure MI, and PM_P1, active on peripheral device P1. In addition, a Blockchain Banager component on a peripheral device may communicate with the Blockchain Banager component on another peripheral device. For instance, if there exists a second peripheral device, P2, with Blockchain Banager component BM_P2 (not shown in FIG. 10), then BM_P1 and BM_P2 may communicate, for instance to coordinate the creation of remote synchronization records.

PM_P1 maintains one blockchain, of which a subset is shown, consisting of subchain (N_1, . . . , N_8) of the primary chain and multiple subchains of secondary chains, S1=(S_1, . . . , S_4, N_5, S_5, . . . , S_7), S2=(T_1, . . . , T_3), and S3=(U_1, U_2, N_4, U_3, U_4), S4=(V_1, V_2, U_2, V_3, V_4, V_5), and S5=(X_1, X_2, X_3, X_4). N_1 is a fork record for S2 and S3, S_2 is a fork record for S2, U_1 is a fork record for S3, and V_2 is a fork record for S5. N_4 is a synchronization record for S3, N_5 for S2, and U_2 for S4. N_6 is a join record for S3, U_4 for S4, and V_4 for S5. PM_P1 may as well maintain more than one content stream of records.

Threads, in FIG. 10 thread1, thread2, and thread3, communicate with BM_P1 by means of inter-process communication, such as sockets, shared memory of semaphores, to supply content for the audit blockchain that is maintained by BM_P1. In FIG. 10, it is shown that PM_P1 maintains one audit blockchain. In general, BM_P1 may maintain more than one audit blockchain.

The two components of the Blockchain Manager 70 in FIG. 10, BM_MI and BM_P1, act cooperatively to enable the transfer of subsets of the blockchains that BM_P1 maintains, to BM_MI. The two components communicate by means of a shared network connection, by shared memory or shared storage and implement functions typically required in a reliable transfer of data between two components, such as flow control. The transfer of data between BM_P1 and BM_MI may use any network protocol, such as serial, UDP, TCP/IP or a proprietary implementation. In any case, the implementation of the Blockchain Manager ensures that component BM_MI can reconstruct the audit blockchain from subsets sent by BM_P1 in presence of various network conditions, such as out of order receipt of subsets sent by BM_P1, and a failure of BM_MI to receive subsets sent by BM_P1, for instance because of failures of records in the network transmission path between BM_P1 and BM_MI, such as gateways or routers.

In FIG. 10, both components of the Blockchain Manager 70, BM_P1 and BM_MI, have an interface, denoted IF_PI and IF_MI, to access BM_P1 and BM_MI respectively. Each interface, IF_PI or IF_MI, may provide access to BM_P1 or BM_MI respectively in one ore more ways, such as by means of a command line interface, a socket, or an Application Programming Interface (API). The interface enables access to the component of the Blockchain Manager 70, to perform administrative functions, such as status queries and retrieval of cached subsets of blockchains. In the example of FIG. 10, one user, user1, exists, who has access privileges to use the functions of interfaces IF_PI or IF_MI.

As explained in FIG. 3 and accompanying text, blockchain continuity entails to guarantee linkage by hash for any newly created record. i.e. in can be added to a subchain starting with the GEN record. This is achieved by giving precedence to the processing of records in the primary chain. If the reliable transmission of records between BM_P1 and BM_MI fails, for instance because of a loss of network connection, BM_P1 will cache unsent records, up to the exhaustion of available memory or persistent storage that is used as buffer space. BM_P1 may then start discarding records of secondary chains, possibly in an order following a configured priority for subchains. It will however not discard records of the primary chain.

In addition to the 'happens before' relationship of two records defined by one being the predecessor of the other, and FORK, JOIN, SYN_L, and SYN_R markers, 'happens before' relationships may be established by taking a snapshot of the audit blockchain and including it into the payload or metadata of a record. A snapshot of an audit blockchain is a set of data structures, whereby each data structure is associated with a record of the blockchain and contains at minimum the hash value of that record. Such data structure is referred to as augmented hash of a record. For instance, the augmented hash of a record may just contain the hash value of that record, or in addition to the hash value further data. If a snapshot is included into a record of a blockchain, a 'happens before' relationship is established between each record in the set of records corresponding to the set of augmented hashes in the snapshot and the record that contains the snapshot. I.e. a record whose augmented hash is contained in a snapshot has been created before the record that contains that snapshot in its metadata.

The set of records whose augmented hashes are stored in a snapshot may be chosen according to various criteria. For instance, a snapshot of the blockchain that is added to a record belonging to the primary chain may contain the augmented hash of each record that has been most recently added to a secondary chain, or to a secondary chain belonging to a specified subset of secondary chains. A snapshot contained in a record of a secondary chain may contain the augmented hashes of records of secondary chains that are children of it, or a subset thereof.

Figure 11:
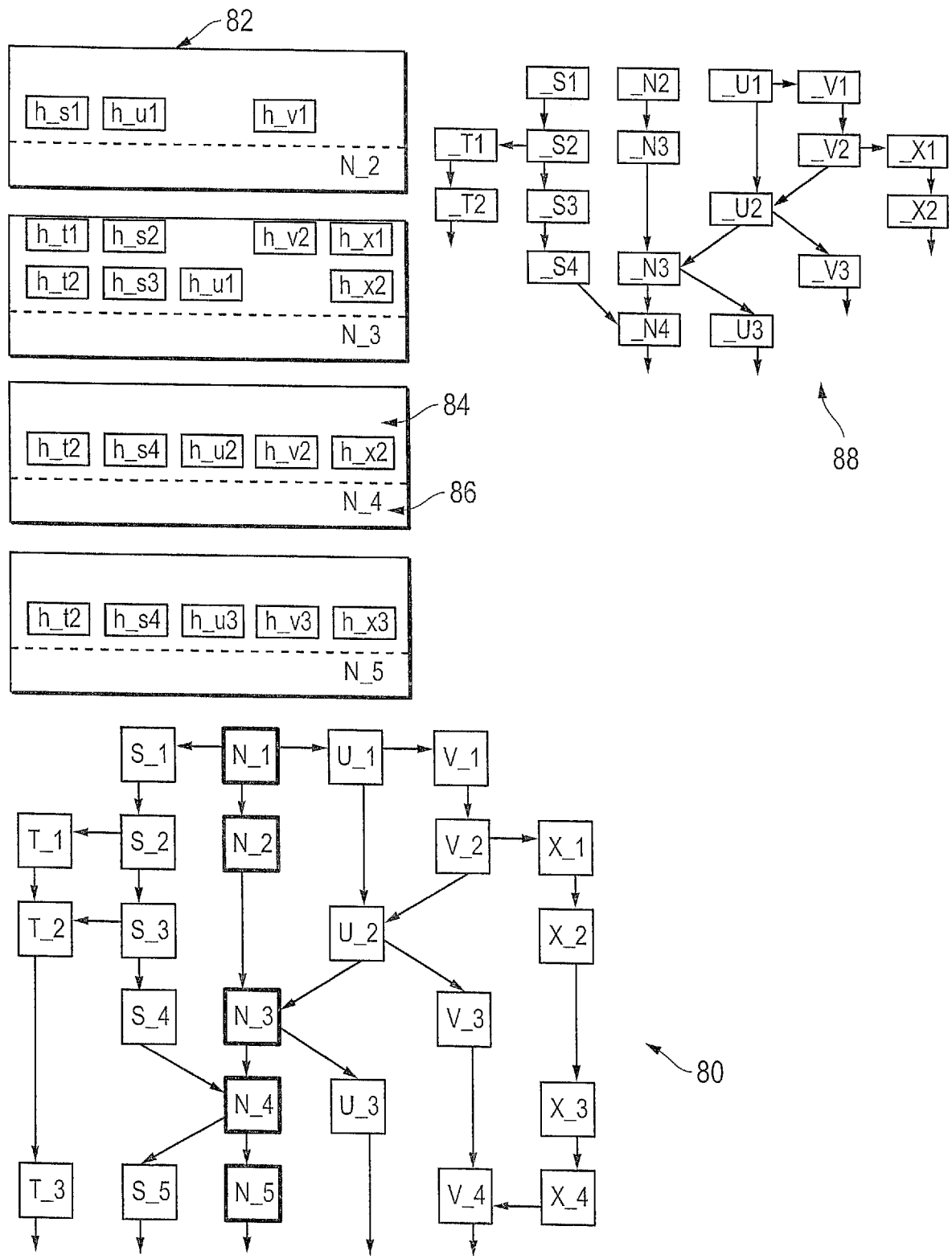
FIG. 11 is a block diagram of a subset of a blockchain showing primary and secondary chains and a snapshot of secondary chains in the metadata of the records of the primary chain.

FIG. 11 shows a subset of a blockchain 80, with primary chain (N_1, . . . , N_5) and secondary chains S1= (T_1, . . . , T_3), S2=(S_1, . . . , S_4, N_4, S_5), S3=(U_1, U_2, N_3, U_3), S4=(V_1, V_2, U_2, V_3, V_4), and S5=(X_1, . . . , X_4). Records are shown horizontally aligned, and the horizontal alignment is assumed to indicate a time wise partial order of their creation. For a given record, B, all records that are depicted above a horizontal line that intersects with B, have been created, i.e. written to memory or persistent storage, before B. For instance, records S_1, U_1, and V_1 have been created before N_2, and a snapshot of the blockchain contained in record N_2 may contain the augmented hash of these records. Records S_1, S_2, S_3, T_1, T_2, U_1, U_2, V_1, V_2, X_1, and X_2 have been created before N_3. A snapshot of N_3 may contain the augmented hash of S_3, T_2, U_2, and X_2, to establish a 'happens before' relationship between these records and N_3. N_3 may contain the augmented hashes of further records which are predecessors of S_3, T_2, U_2, and X_2. For instance, the snapshot stored in N_3 may contain the augmented hashes of records S_1, S_2, S_3, T_1, T_2, U_1, U_2, V_1, V_2, X_1, and X_2.

Records 82, N_2, . . . , N_4, are depicted in more detail. For these records 82, the metadata and payload section are shown. For instance, for record N_4, 84 is the metadata and 86 is the payload. The metadata of each record contain the hash of its predecessor in the primary chain. For instance, the metadata of record N_3 contain the hash of record N_2. This hash value is not shown in the depiction of metadata in FIG. 11. The metadata of each record N_2, . . . , N_4 contain a snapshot of the blockchain. For instance, the snapshot stored in the metadata of record N_2 is made up of h_s1, h_u1, and h$^+$ v1, which are the augmented hashes of records S_1, U_1, and V_1 respectively. Since N_2 has been created after S_1, U_1, and V_1, the snapshot contained in N_2 establishes a 'happens before' relationship between S_1 and N_2, U_1 and N_2, and V_1 and N_2.

A snapshot may contain sufficient information to reconstruct the payload stripped stream of a blockchain or subchain thereof from a set of snapshots. In FIG. 11, the metadata of record N_3, in addition to the augmented hashes of the corresponding last record of each secondary chain, that had been created before N_3, augmented hashes h_S3, h_T2, h_U2, h_V2, and h_X2, for records S_3, T_2, U_1, V_2, and X_2 respectively, contain the augmented hashes of all records that have been added to secondary chains, but had not been included into a previous snapshot. These are the augmented hashes h_S2, h_T1, and h_X1 of records S_2, T_1, and X_1, assuming that these records did not exist at the time N_2 had been created. Record N_4 contains the augmented hashes h_S4, h_T2, h_U2, h_V2, and h_X2, corresponding to the most recently added records to secondary chains, S_4, T_2, U_2, V_2, and X_2. If every record of the primary chain contains a snapshot that includes augmented hashes of the most recently added records of secondary chains, whereby each such record had not been added to a previous snapshot, N_4 at minimum would need to contain augmented hashes h_S4 and h_v3, of records S_4 and V_3 respectively. In described way, each augmented hash of a records added to a secondary chain is contained in a snapshot that is included into a record of the primary chain. Thus, as records are added to the blockchain, the snapshots contained in records of the primary chain successively include the augmented hashes of all records of secondary chains S1, . . . , S5.

The augmented hash may contain information that supports reconstructing the topology of a subset of a blockchain from the augmented hashes of records belonging to that subset. The augmented hash of a record, aside the hash value of that record may contain information contained in the metadata of that record, including FORK, JOIN, SYN_L, and SYN_R markers. The augmented hash may further contain an identifier for the record, such as a serial number, and identifiers of records that are predecessors of it. Such record identifiers may be contained in the metadata of a record or in section BC Control in FIG. 1.

FIG. 11 illustrates reconstructing the topology of a subset of a blockchain.

Assume each augmented hash of a record contained in the snapshot that is stored in a record of the set of records 82 N_2, . . . , N_5 includes information that supports reconstructing the topology of a subset of a blockchain. The subset of a payload stripped stream of data records 88 is the payload stripped stream that is constructed of the subset of a blockchain given by the set of records made up by N_2, . . . , N_5 and all records whose augmented hashes are contained in snapshots stored in the metadata of records 82 N_2, . . . , N_5, and further of using the topology information given by the entirety of aforementioned augmented hashes. For example, the augmented hash h_S2, in addition to the hash value of record S2, contains the FORK marker associated with an identifier for record T1 of secondary chain S_1, allowing to reconstruct S2 as predecessor of T1, and T1 as first element of a secondary chain for which S2 is the fork record. Thus, a payload stripped record, _S2, corresponding to S2, and its predecessor relationships with other payload stripped records can be established. h_S2 further contains an identifier for S1, the predecessor record of S2. h_S1 contains the hash value of record S1, hash S1, which is going to be included into _S2. A payload stripped record, _Sx, that is contained in the payload stripped stream 88, constructed from a set of augmented hashes, may only contain a subset of the inner metadata of its corresponding record, Sx, in subset 80 of a blockchain. Nevertheless, the subset of metadata contained in _Sx is designed to be sufficient to integrate 88 into the payload stripped stream of the audit blockchain to which 80 belongs, 49 in FIG. 5, and to support the functions of the audit method described for FIG. 4 and FIG. 5.

FIG. 11 illustrates reconstructing the payload stripped stream of a blockchain from a set of snapshots that are successively added to records of the primary chain, and these snapshots in their entirety contain the augmented hashes of all records of all secondary chains. More general, the payload stripped stream corresponding to a subset of records of a blockchain can be reconstructed from a set of snapshots that is included into any set of records. For instance, in the example illustrated by FIG. 11, the entirety of augmented hash values contained in the snapshots that are stored in records 82 N_2, . . . , N_5 may correspond to the augmented hash values taken of the set of records that make up subchains of secondary chains belonging to a subset of S1, . . . , S5.

Snapshots may be stored in a secondary chain, or a set of snapshots may be stored in a set of records that do not all belong to the same subchain. For instance, consider the example of a blockchain given in FIG. 9. The records of secondary chain S2=(B1.1, B1.2, B1.3, B1.4, B1.5) may contain snapshots to reconstruct the payload stripped stream of a subset of the blockchain made up by secondary chains S2, S3=(B1.3.1, B1.3.2, B1.3.3), and S4=(B5.1, B5.2, B5.3). Both, S3 and S4, do not join S2. Snapshots containing augmented hashes of records that are added to S3 or S4 after S2 has terminated may be stored in records belonging to subchains other than S2. For instance, assume record B1.3.4 of S3 and record B5.2 of S4 are generated after S2 has terminated. A snapshot containing the hash values of these records may be stored in record B7 of the primary chain.

An implementation of the Blockchain Manager 70 in FIG. 10, made up of components BM_MI and BM_P1 may support selecting the record to which a snapshot is added in a random fashion or it may do so according to an algorithm that aims at increasing cryptographic strength by introducing randomness into records. For instance, assume that records of a a secondary chain contain a payload that has a repeating pattern, which makes it more vulnerable to a cryptographic attack. The Blockchain Manager may add select records of such subchain to forward snapshots, to increase cryptographic strength.

Subchains of a blockchain may be cached on a device that created the blockchain, here P1, or another device, while preserving its essential properties for an audit. In FIG. 10, BM_P1 may defer the transmission of records of secondary chains, due to shortages of resources, such as energy or network bandwidth. For instance, assume that the payload of secondary chain S2 is a large binary data dump, and the subchain (T_2, T_3) cannot be transmitted, because of limited energy resources or network bandwidth, or no acknowledgement by BM_MI is received for the transmission of records T_2 and T_3 (it is possible, that network transmission errors only affect certain traffic patterns, for instance network packets of certain lengths). However, (T_2, T_3) can be permanently stored on device P1, for instance in SDRAM, and retrieval by physically accessing the device and copying data is possible.

A data stream, presented as payload of a subchain of records that are cached by the Blockchain Manager component on a peripheral device, satisfies criteria for auditability if the payload stripped stream of that subchain is stored on an escrow service, as part of a payload stripped audit blockchain. This can be achieved by means of snapshots, described in FIGS. 10 and 11, as follows:

S' denotes the set of subchains S1, . . . , S5 of secondary chains described in FIG. 11, as subchains in the subset 80 of a blockchain. Assume that records of S' cannot be sent to the management infrastructure because of resource shortages. However, these records are cached or saved in storage of peripheral device P1 in FIG. 10. The Blockchain Manager 70 component on device P1, BM_P1, upon determination that these subchains cannot be sent to the management infrastructure, generates records of the primary chain that each contain a snapshot. Examples of such records are N_2, . . . , N_5 as described in FIG. 11 and accompanying text. The metadata of N_2, . . . , N_5 further contain information indicating that the records of these subchains are cached on the device where BM_P1 resides.

The management infrastructure (MI in FIG. 10), upon receipt of records N_2, . . . , N_5, uses the snapshot information that is stored in their metadata to construct a payload stripped representation, _S', of the subset of the audit blockchain S'. _S' corresponds to 88 in FIG. 11. The management infrastructure then forwards _S' to the escrow service, which integrates _S' into the payload stripped stream of records associated with the blockchain to which the subset of the blockchain, 80 in FIG. 11, belongs. In the representation of the audit blockchain stored in the Blockchain Store, information about S' is present in the metadata of N2, . . . , N5. The topology of S' can be reconstructed from that metadata, which as well contain an identifier for peripheral device P1.

If resources later permit, BM_P1 70 in FIG. 10 may forward these subchains and they are added to the audit blockchain stored in the Blockchain Store of the management infrastructure. If not, an audit of that blockchain entails the following steps:

1. The escrow service receives the audit request for the blockchain and retrieves the payload stripped stream corresponding to it from the Hash Value Store.

2. The escrow service sends a request to the management infrastructure MI for a copy of the blockchain that is subject of the audit and creates a payload stripped stream of records (payload stripped representation) of it.

3. The management infrastructure MI retrieves the copy of that content stream of records from its Blockchain Store and makes it available to the escrow service. In that copy, records N_2, . . . , N_5 contain information about S', in particular an identifier of the device where S' is stored, P1.

4. The escrow service, upon detecting that subset S' needs to be retrieved from device P1, initiates retrieval of S' from P1. It may do so in an automated way, provided the escrow service can access P1, or it may issue a notification upon which these data are retrieved by an operator. The operator may retrieve a copy of S' from P1 either by means of a remote command, issued on BM_MI 70 on management infrastructure, or he may access the device by means of interface IF_PI on BM_P1 in FIG. 10.

5. The management infrastructure MI may insert the subset S' into its copy of the audit blockchain or it may forward it to the escrow service, which will insert it into its copy of the audit blockchain, if the escrow service maintains it's a copy of the audit chain for the duration of the audit.

6. Audit then proceeds as described in FIGS. 4 and 5 and accompanying text, starting with step 3.

A snapshots of an audit blockchain fulfills multiple purposes. It establishes a time wise correlations between records of an audit chain with finer granularity and less computational overhead than a SYN_L record, or it can be used to increase cryptographic strength. Most importantly, a snapshot allows to the generation of data that are suited to be used for the audit scheme described by this invention under conditions of resource shortage. A subset of an audit blockchain satisfies the criteria for auditability of present audit scheme, even if it is not transmitted and stored in a Blockchain Store, but saved in memory or storage of a peripheral device, and as long as snapshot data of it can be sent.

Multi-tenancy is a common requirement in a setup as illustrated by FIG. 3, used for instance to monitor a technical installation. Often multiple operators exist in the management of an industrial site, called "tenants" herein. Each tenant may need to access a set of peripheral devices for the latter to perform actions, and devices may need to allow concurrent access by multiple tenants. Each tenant may have its own requirements with regards to data collection, management and access of them, such as to obtain data about technical performance, for billing, or audit. A tenant may be prescribed to use a given audit service. A tenant may need to prove that equipment operated by it to actions in response to events generated or observed by equipment of another tenant, and thus have a need to prove time wise correlation of its actions with the ones of other tenants. The audit system of this invention lends itself to be easily extensible to a multi-tenant setup.

Figure 12:
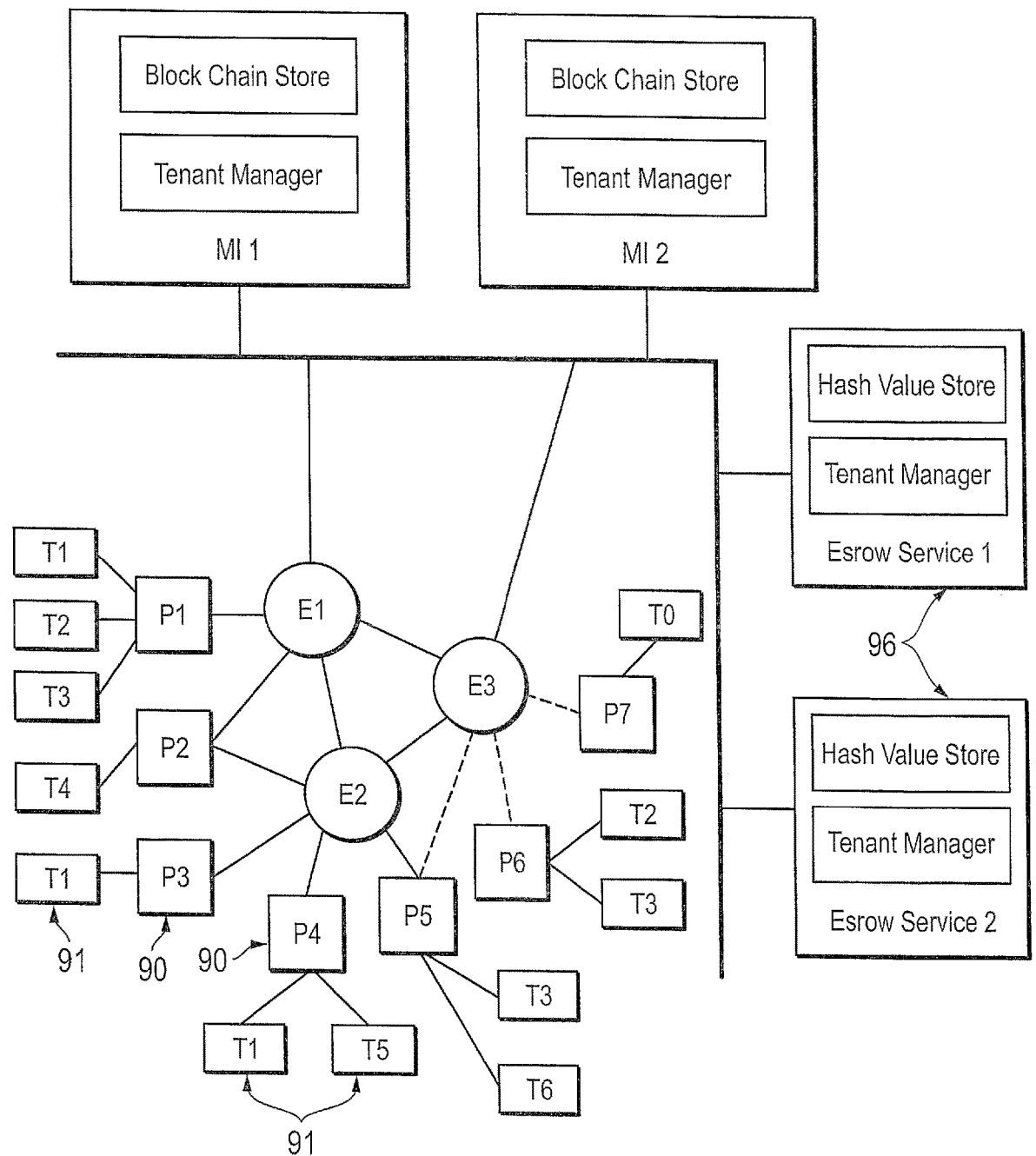
FIG. 12 is a block diagram of a computing infrastructure in a multi-tenant configuration.

FIG. 12 shows the distributed infrastructure of FIG. 4 in a multi-tenant setup. Each peripheral device 90 of the set P1, . . . , P7 is accessible by one or more tenants 91, here T0, . . . , T7. Each tenant 91 may use a given peripheral device 90 for various purposes in the functions that the set of peripheral devices provides, such as taking measurements or controlling equipment.

Subsystems on all components, management infrastructures M1 and M2, the two escrow services 96 and the peripheral devices 90 (P1, . . . , P7), provide for a distributed implementation of the services to support multi-tenancy in the use and management of an audit blockchain. Each component has a tenant manager, in FIG. 12 not shown for peripheral devices. The tenant managers of all components make up the distributed tenant manager for audit blockchains. The tenant managers operate in a distributed fashion to provide the services required for multi-tenancy in the use and management of an audit blockchain.

The distributed tenant manager for audit blockchains implements the functions typically required for a distributed infrastructure to provide its services to multiple tenants, for the management of audit blockchains, including access control, data isolation, encryption and management of it. Functions provided by the distributed tenant manager for audit blockchains include access control and encryption management for tenants, role based access rules and hierarchies, the assignment of secondary chains to tenants, and the retrieval of them from the Blockchain Manager on the peripheral device or the Blockchain Store on the management infrastructure. The distributed tenant manager for audit blockchains also implements privileges for the access to payload stripped streams of subsets of the audit blockchain in the hash value store on the escrow server.

Figure 13:
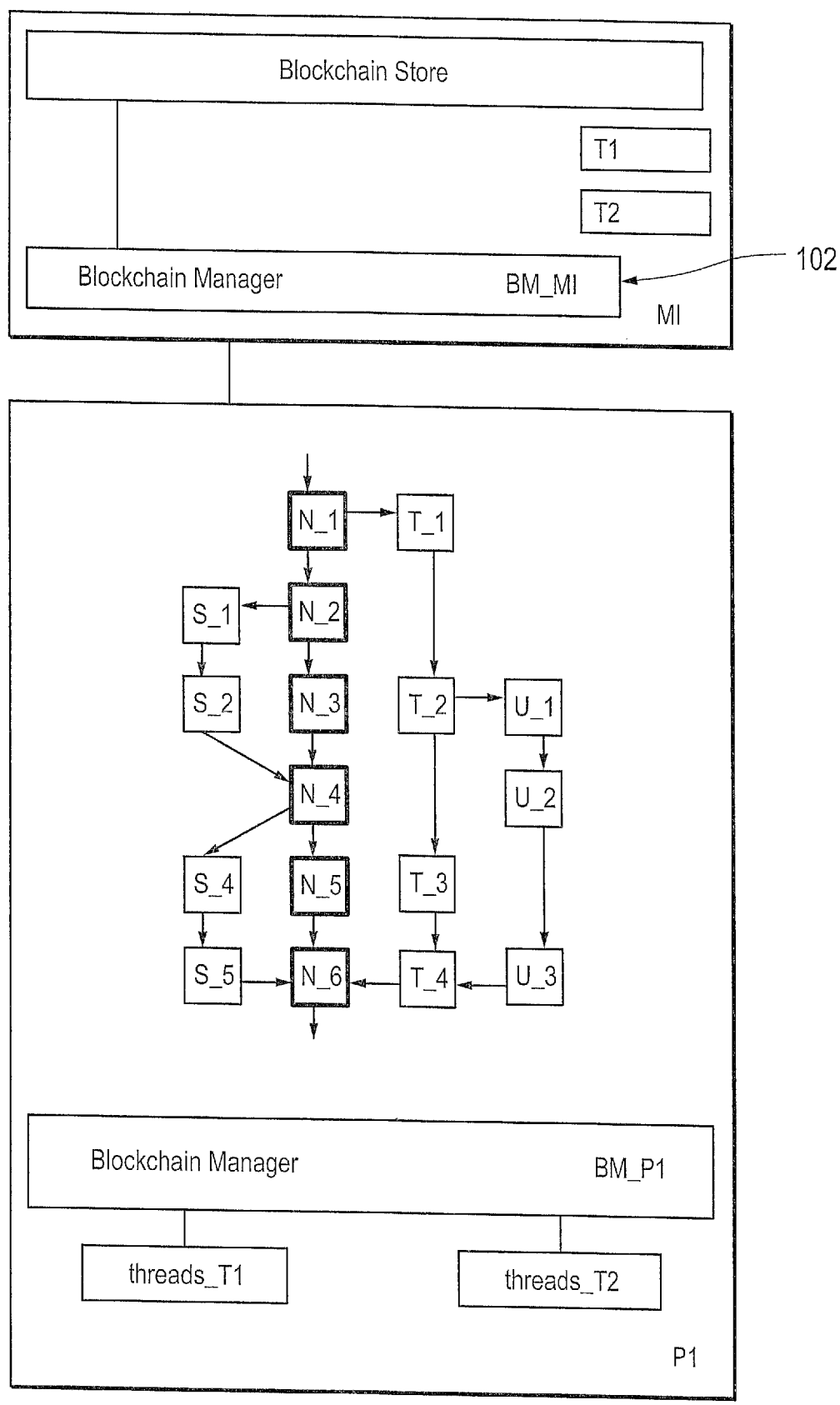
FIG. 13 is a block diagram of the interaction of components in transferring records from a peripheral device to a management infrastructure in a multi-tenant configuration.

For instance, the distributed tenant manager for audit blockchains provides for the access of secondary chains of a blockchain for tenants that have privileges to do so. Consider for example tenant T1 in FIG. 13. T1 has access to peripheral devices P1, P3, and P4 (only P1 is shown in FIG. 13). Each of the three peripheral devices runs threads and processes on behalf of T1. Such threads and processes may have a user identity associated with T1 or another thread may perform services for T1, as specified by configuration parameters. On each aforementioned peripheral device T1 has access privileges for one ore more secondary chains of an audit blockchain that is managed on the device. T1 might provide the audit data stream for such secondary chain, or provide encryption keys for its payload. Also T1 might retrieve secondary subchains for which it has access privileges, or query their status or statistic about it. On a component of the management infrastructure, MI 1 or MI 2, T1 has access to retrieve secondary chains, for which it has privileges, from the Blockchain Store, run queries or retrieve statistics about it. T1 further has privileges to retrieve payload stripped representations of the secondary blockchains, for which it has privileges, and may have also authorization to initiate an audit for them, or confer authorization for an audit to another entity.

Sets of threads and processes, associated with tenant T1, each set active on one peripheral device, P1, P3, or P4, may act in coordination to implement a joint function on multiple peripheral devices. For instance, two sets of threads and processes, one active on P1, and the other on P3, may act in coordination to implement a remote synchronization of blockchains, (FIGS. 8.a and 8.b). In more detail, the Blockchain Manager on P1 may communicate with the Blockchain Manager on P3 to establish remote synchronization of secondary chains, both associated with T1. (The Blockchain Manager on a peripheral device has been described as component BM_P1 in FIG. 10.) This might entail querying the Blockchain Manager of P1 or P3 to obtain information about secondary chains that are maintained to T1. The Blockchain Manager on P1, upon instruction by a thread or process associated with T1, may communicate with the Blockchain Manager on P3, to generate a remote synchronization record for a known secondary chain.

For instance, the set of processes and threads belonging to T1, that implement a joint action on P1 and P3, may coordinate their actions with a set of threads and processes of tenant T2, that are active on P1 and P6.

Communication functions that are typically required for multi-tenancy, such as protocols for data exchange and synchronization between sets of threads and processes that are active on distinct devices, may use audit blockchains to provide for the establishment of a 'happens before' relationship of events, and thus for their time wise correlation.

To prove fulfillment of contractual obligations, data streams generated by processes owned by tenant need to be time wise correlated. The design of audit blockchains, with its concept of secondary chains, (see FIG. 3 and accompanying text), is easily extensible to support functions typically required in a system that supports multi-tenancy.

1. Multiple sets of threads, each set associated with one tenant, are active on the same device and generate data streams that will be represented by secondary chains of the same primary data stream.

2. Multiple sets of thread, not all associated with the same tenant, are active on multiple devices. They generate data streams as secondary chains of the corresponding primary audit chain of a device. A 'happens before' relationship between them is established by a management infrastructure, to which the peripheral devices transmit their data streams.

3. Sets of threads as described in 1. or 2. for which the management infrastructure in addition establishes a 'happens before' relationship with data streams generated external to the infrastructure, i.e. originating from components other than P1, . . . , P7 and M1, M2 in FIG. 12.

FIG. 13 shows a configuration consisting of a peripheral device P1, and a management infrastructure, MI, as already described in FIG. 10, in a multi-tenant configuration. On P1, two sets of processes and threads, threads_T1 and threads_T2, each generate a data stream that is forwarded to the Blockchain Manager, BM_P1.

In FIG. 13 (N_1, . . . , N_6) is the primary chain. Secondary chain (S_1, S_2, N_4, S_4, S_5) is the chain generated from the data stream provided by threads_T1. Secondary chains (T_1, . . . , T_4) and (U_1, . . . , U_3) are generated from threads_T2. Records of the aforementioned subchains of secondary chains may contain tenant IDs, or keys for authentication. Subsets of metadata or the payload of such record may be encrypted.

The Blockchain Manager 102 on the management infrastructure, BM_MI, upon receipt of a subchain inserts it into the corresponding blockchain.

Figure 14:
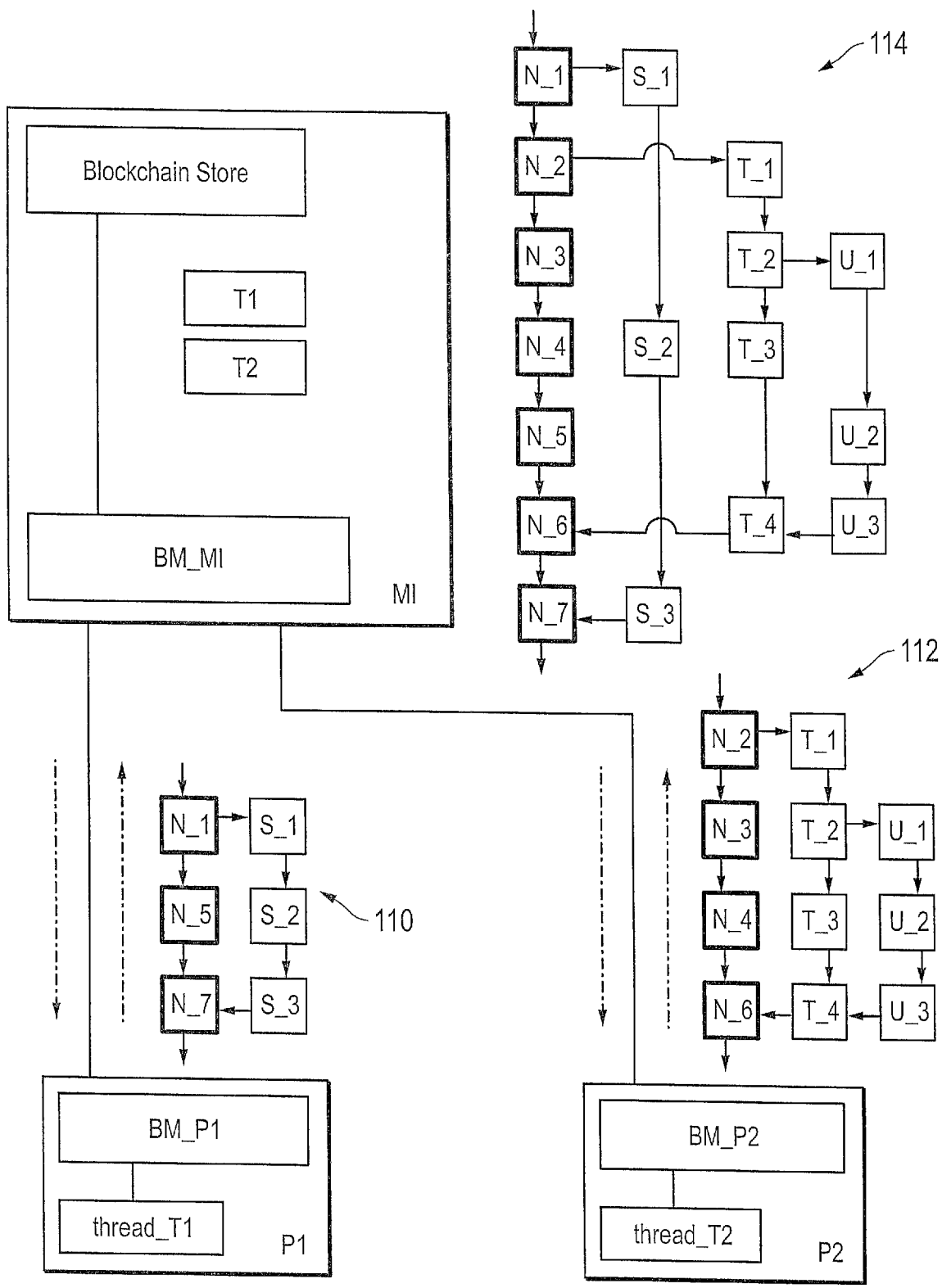
FIG. 14 is a block diagram of a system including peripheral devices and a management infrastructure.

FIG. 14 shows a configuration consisting of two peripheral devices, P1, and P2, and a management infrastructure, MI. A set of threads, thread_T1, associated with tenant T1 is active on P1, another set, thread_T2, associated with tenant T2, is active on P2. thread_T1 generates secondary chain S1=(S_1, . . . , S_3), which is linked to a subchain of the primary chain, (N_1, N_5, N_7), of blockchain 110. thread_T2 generates secondary chains S2=(T_1, . . . , T_4), and S3=(U_1, . . . , U_3), of which S3 is linked to S2 and S2 is linked to a subchain of the primary chain (N_2, N_3, N_4, N_6), belonging to blockchain 112 on P2. BM_P1 and BM_P2 send corresponding chains, 110 and 112, to BM_MI, which performs a join of the primary chains, to arrive at subchain (N_1, . . . , N_7) of blockchain 114, which preserves the order of elements of each subchain of a primary chain, (N_1, N_5, N_7) and (N_2, N_3, N_4, N_6). The naming of the elements of the two subchains of primary chains has been chosen to illustrate the order of elements in the merged primary chain. Each label 'N_i' may be any identifier for a record, such as a name or serial number.

Figure 15:
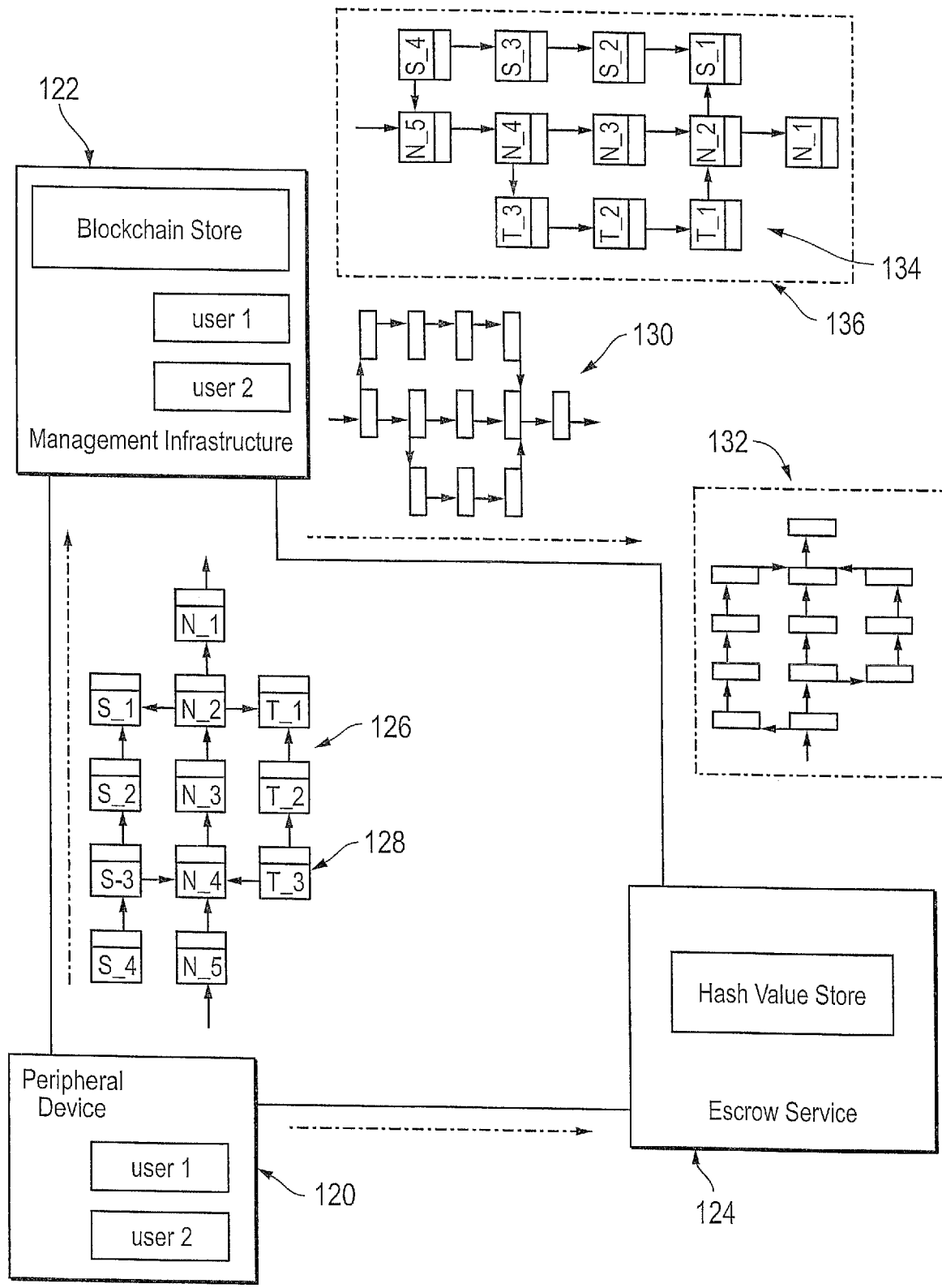
FIG. 15 is a block diagram showing the interaction of components in a multi-tenant configuration.

FIG. 15 shows a minimal configuration of components to illustrate the cooperation of components described in FIG. 4 and associated text to implement the proposed method for auditing in a multi-tenant configuration. FIG. 15 comprises a peripheral device 120, a management infrastructure 122 and an escrow service 124. Two clients exist, user1 and user2, configured on the peripheral device 120 and the management infrastructure 122. Both provide support for a multi-tenant implementation for the management of audit blockchains, which include access privileges and data isolation, and optionally further functions, such as support for encryption management, and Quality of Service rules.

The peripheral device 120 maintains an audit blockchain, of which a subset is shown at 126. For each record, the metadata section is shown, for instance 128 depicts the metadata for record T_3. The subset of the audit blockchain, (126) shows one subchain of the primary chain, (N_1, . . . , N_5), and two secondary chains, S1=(S_1, . . . , S_4) and S2=(T_1, . . . , T_3). S1 is maintained for a data stream provided by user1, and S2 is maintained for a data stream provided by user2. The subset of the audit blockchain 126, is transferred to the management infrastructure 122, where it is added to the copy of the audit blockchain that is maintained in the Blockchain Store 136. 134 shows the subset of the audit blockchain 126 in the Blockchain Store. A payload striped stream of data records 130, of the subset of the audit blockchain 126, is forwarded to the escrow service 124 and added to the payload stripped representation of the audit blockchain maintained there. 132 shows the payload stripped representation of subset 126 of the audit blockchain in the hash value store.

The management infrastructure 122 provides for the implementation of multi-tenancy for the Blockchain Store. A user may query the Blockchain Store to retrieve secondary chains and subchains of them, for which it has access privileges.

An audit of data stored as payload of a content stream of records then entails the following steps:

1. The escrow service receives the audit request for the blockchain and retrieves its payload stripped stream of data records (payload stripped representation of it) from the Hash Value Store.

2. The escrow service sends a request to the management infrastructure 122 for a copy of the blockchain that is subject of the audit and creates a payload stripped stream of data records.

3. The escrow service performs a comparison of the two payload stripped streams of data records representations of the blockchain, the one retrieved from the Hash Value Store (step 1) and the one created from the audit blockchain stored in the Blockchain Store 126. They need to match with regards to record content and topology of the subset.

4. If the test performed in step 3. passed, or at least for a set of maximal subchains of the stripped blockchain, starting at the genesis record, a verification of hash values will be performed for the corresponding subchains in the Blockchain Store. I.e., for each such subchain, starting with the genesis block, hash values of records are recalculated consecutively. For instance, for any two records K and L belonging to blockchain 134 stored in 136, and K being the predecessor of L, it is verified that the hash value of K, coincides with the hash value stored in the metadata of L. More generally, depending on the linkage function used, such verification may involve multiple predecessor records of L.

A subchain is considered correct, if linkage of hash can be proven. I.e., for each record of it, B, there exists a subchain GEN=$B\_1$, . . . , $B\_n$=B, whereby $B\_i$ is a predecessor of $B\_(i+1)$ and the hash value of the predecessor record, stored in the inner metadata segment of $B\_(i+1)$, coincides with the hash value calculates of $B\_i$.

FIG. 2 shows a possible data structure for a payload stripped stream of corresponding to a content stream of data, made up of records, whereby there is a one-to-one mapping between a record of the content stream of data and the payload stripped stream of content. More generally, the payload stripped steam of content corresponding to a content stream of data may be implemented by any set of data structures that supports the method of audit described in 5.5. In more detail, for each record in the content stream of data, such set of data structures must contain the hash value stored in that record, and the set of hash values corresponding to records of a payload stripped stream of data must be presented by data structures in a way that allows for reconstructing the topology of the content stream of data. In particular, if two records of the content stream of data have a predecessor relationship, i.e. one is a predecessor of another, their corresponding hash values need to be represented by data structures for the payload stripped stream of data in a way that the predecessor relationship can be reconstructed, and likewise for relationships between records established by FORK, JOIN, SYN_L and SYN_R records in the content stream of data. Further, if the design of a record of a content stream of data includes a structure for inner metadata, as shown in FIG. 1, the set of structures representing the payload stripped stream must support storing the inner metadata in association with the hash value corresponding to a record.

Hardware Configurations and Examples

1. Water Pipe Infrastructure

An example where the present invention may be used is in a water pipe system, to collect data generated by flow meters, pressure meters, or control equipment, such as shutoff valves, that are enabled for the collection and transmission of data in digital format. For reasons of reliability and costs of replacement, the majority of water meters in water pipe systems still work on a purely mechanical basis. In recent years, efforts have been made to equip water pipe systems with meters and sensor and control devices that are enabled for the generation and transmission of data in digital format, often referred to as smart water meters, or smart devices.

Provisional patent applications Sensor Network, Sensor Device And Method For Detecting Defects In Pipe, having application Ser. No. 62/295,287, and Retrofitting a Flow Meter, having application Ser. No. 62/418,952 (incorporated by reference herein) describe how to retrofit a traditional water meter, or more generally a flow meter, that works on a purely mechanical basis, with a retrofit sensor device, for data collection and transmission of them in digital format. Smart water meters or water meters equipped with retrofit sensor devices are capable of generating data, such as the current measurement of accumulated water throughput, and possibly auxiliary data, and transmitting them in real-time. Aside the benefit of automated meter readings, which obviates the need for manual meter inspection or data collection in drive-by mode, in case of older smart meters, that are enabled for digital data collection and transmission of them by an RF signal, such data may be used for various other purposes. For instance, the utility provider may run an experiment to generate data for water throughput and other measurements concurrently, by many devices, with the goal to detect water leaks in the pipe infrastructure. Sensor devices that are attached to a pipe infrastructure may as well be enabled to generate further measurements of environmental data, for instance temperature, humidity and vibration signatures, and the operator of the water utility may make these data available to third parties. For smart water meters and sensor and control devices installed at pipe systems, the described challenges for the generation and processing of data that satisfy regularity requirements for audit apply: pipe systems may experience intermittent outages, due to an exhaustion of energy resources, and a proof of identity of a device associated with a data stream is required. Such problems are addressed by an audit method and system described herein.

2. Fracking Site

Another example where an embodiment of the method or system in accordance with the present invention may be used is the technical infrastructure at a fracking site. Multiple isolated pipe systems exist, for water to be injected into the ground, wastewater, and the extracted oil or gas. Such infrastructure often involves multiple stakeholders, each operating a part of the installation. The fracking process needs to comply with environmental and other regulatory standards. For instance, the operator of a water pipe systems need to document that for water injected into the ground, pressure and volume lie within prescribed ranges, and that further the pressure in the entire pipe system is within safety limits. Water may originate from multiple intakes, which for billing purposes requires record keeping about the water volume supplied by each. Further, for geological evaluation and compliance with safety standards, the volume of disposed wastewater may need to be recorded as well. In case of an accident or an operational state of the technical installation that is deemed outside of the range of safe operating conditions, date about the operational state of components need to be analyzed to determine the cause.

The pipe system is equipped with various sensor devices, to measure and record throughput and pressure of the medium transported in the pipe, water, wastewater, oil, or gas. Such sensor devices include retrofit devices for flow meters as described in FIG. 1 and accompanying text. Sensor devices that measure intra-pipe pressure may generate alerts if the pressure exceeds a prescribed range and initiate an action with a control device that regulates a valve. A sensor or control device keeps one or multiple logs of its operation and sends audit data to one or more control infrastructures. The latter are software applications, each active on a set of servers that administer sensor and control devices. Each control infrastructure receives audit data from the sensor devices that are under its administration. The audit data sent by sensor and controller devices include data about the water throughout for billing purposes, and other information, such as the water pressure.

Further audit data forwarded by sensor and control devices may pertain to the management of the pipe systems by them. For instance, a stream of audit date may document that a device that regulates the pipe pressure by means of controlling a valve has received a notification from a sensor device containing a measured value for the pipe pressure, and in response has initiated a corrective action. Likewise, the sensor device will include into its stream of audit data that it has sent to the control device the collected measurements of pipe pressure or instructed it to take a corrective action. In case of an incident, for instance the pressure in the pipe exceeding a maximum value, the audit data generated by the sensor device that measures the pressure, and the device that controls the valve can be analyzed to find the technical component at fault. It is obvious, that unlike, for instance, a sensor device at a residential end point of a water pipe infrastructure for which intermittent outages can be tolerated, a sensor or control device that is critical for the reliability and safety of the operation of a technical infrastructure will have its power supply designed and dimensioned in a manner that guarantees continuous operation of the device.

The operator of the site is required to ensure that measurements for air pollution do not exceed the maximum allowed values, and sensor devices exist that measure parameters for air pollution. In addition, some sensor devices contain vibration sensors, to gauge seismic activity. The measurements taken by these sensors are sent to the management infrastructure as well. Also, each sensor or control device will periodically report its health status.

The audit data generated by the set of sensor and control devices are of interest to multiple parties. For instance, the operator of a pipe infrastructure may use them to generate billing data for water use. A government agency may request access to data about air pollution measurements and data generated by vibration sensors for the purpose of monitoring compliance with environmental standards.

The audit system and method presented here addresses the challenges of generating reliable audit data for above described installation and their use by multiple parties.

3. SCADA

Supervisory Control and Data Acquisition, SCADA, is a control system architecture and standard for a high-level supervisory management of processes in industrial plants, or in technical installations in general. Such installations may be geographically distributed, and operated by multiple independent entities. All aforementioned, traffic light control, water utility management, and pipe infrastructures, are examples of installations that frequently are managed by SCADA systems, and the infrastructures described above may include as well the hardware and software components that are required to operate as part of a SCADA system.

The SCADA architecture has widely recognized weaknesses with regards to data security. This is a concern to many users of it, who do not or only reluctantly entrust a SCADA system with storing confidential information, for instance the volume of oil production.

Another advantage of the audit method presented here is that it doesn't require the storage of audit data, i.e. data presented in the payload of records of a blockchain, with a third party. All what is required to be stored at a third party is the sequence of hash values of records of an audit blockchain. This addresses safety concerns that exist for instance for SCADA systems. Obligations for the management of the stream of audit data, their safe storage and safekeeping from data theft, are with the operator of the technical installation, instead, for instance, having them stored on the premises of a third party that operates a SCADA system.

What is claimed:

1. A method of recording data from a number of devices in a distributed network system in a manner adaptable for audit, comprising:
   recording an audit blockchain stream of data records to a device database comprising a sequence of records linked by hash values output from one or more of said devices where each record has a payload segment including content from said devices and a metadata segment,
     where the metadata segment includes the hash value of a predecessor record in the stream and the identity of a device outputting said data records;
   recording a payload stripped stream of said audit blockchain stream of data records with an escrow service where the payload stripped stream does not include the payload segment;
   recording with the escrow service the hash values used for recording said audit blockchain;
   verifying a specified audit blockchain of one or more data records from said device database,
     retrieving the payload stripped stream of said specified audit blockchain from said escrow service,
     retrieving said specified audit blockchain from said device database,
     creating a content stripped representation of said specified audit blockchain,
     comparing the 1) content stripped representation of said specified audit blockchain with the 2) payload stripped stream of said specified audit blockchain from said escrow service.

2. The method of claim 1, wherein a hash value in a record is calculated based at least on a payload in a predecessor record and a linkage function.

3. The method of claim 2, wherein the linkage function includes a cryptographic function applied to the payload of one or more predecessor records.

4. The method of claim 2, wherein the linkage function changes periodically.

5. The method of claim 1, wherein the audit blockchain and the payload stripped stream are recorded in parallel to separate databases.

6. The method of claim 1, wherein at least some of the data records are encrypted prior to recording.

7. The method of claim 1, wherein at least some of the data records are stored in a buffer and later stored in a database.

8. The method of claim 1, including verifying the specified audit blockchain if the comparison between the 1) content stripped representation of said specified audit blockchain with the 2) payload stripped stream of said specified audit blockchain from said escrow service is a match.

9. The method of claim 1, wherein the devices include one or more control, sensor, edge, or peripheral computing devices physically separate in the distributed network system and in communication with a control server.

10. The method of claim 1, including auditing the audit blockchain of data records by determining the hash values of each audit blockchain data record and comparing the audit blockchain hash values with the hash values recorded with the escrow service.

11. The method of claim 1, including recording one or more subchains of the audit blockchain data records using a fork operation.

12. The method of claim 1, comparing two subchains to establish a time wise correlation of events.

13. The method of claim 1, wherein the first record in said audit blockchain of data records output from each of said devices is a genesis block created by a device and includes a strong random number.

14. The method of claim 1, wherein the first record in said audit blockchain of data records output from each of said devices is a genesis block transferred to a device in a trusted manner and is communicated to an escrow service in a trusted manner.

15. A system collecting and verifying audit records from a number of devices comprising:
a number of devices in a distributed network system which communicate with a central data repository and generate an audit blockchain of data records, each data record in a content stream having a payload segment and a metadata segment,
the devices and the central data repository operable to generate an a stripped stream of data records stripped of the payload segment, where the metadata segment includes the hash value of a predecessor data record;
a communication network operable for communication between said devices and said central data repository;
a database operable coupled to said central data repository for recording said audit blockchain from said devices; and
an escrow service;
the escrow service operable to generate a payload stripped stream from said audit blockchain and having an audit database operable for recording said payload stripped stream,
and
the escrow service operable to audit a specified audit blockchain of data records by comparing the payload stripped stream and the specified audit blockchain of data records.

16. The system of claim 15, wherein the hash value in a record is calculated based at least on a payload in a predecessor record and a linkage function.

17. The system of claim 16, wherein the linkage function includes a cryptographic function.

18. The system of claim 15, wherein the audit database is stored with a third party escrow agent physically remote from said distributed network system.

19. The system of claim 15, wherein the devices include one or more control, sensor, edge, or peripheral computing devices physically separate in the distributed network system and in communication with the central data repository.

20. A method of auditing a stream of data records generated by a number of devices in a distributed network system comprising:
recording an audit blockchain of first data records output from at least one of said devices to a management infrastructure where each first data record has a payload segment including content from said devices and a metadata segment, where the metadata segment includes the hash value of a predecessor record in the first data records;
recording an escrow payload stripped stream of first data records in an escrow service where each escrow payload stripped stream record has a metadata segment but does not have the payload segment, where the metadata segment includes the hash value of a predecessor record in the stream;
auditing said audit blockchain of first data record including
i) retrieving a copy of said audit blockchain of first data records from said management infrastructure,
ii) creating a management infrastructure payload stripped stream of said audit blockchain of first data records,
iii) comparing the management infrastructure payload stripped steam with the escrow payload stripped stream.

21. The method of claim 20, including establishing multiple subchains of the escrow payload stripped stream using fork and join operands and determining a time wise correlation between two or more subchains.

22. The method of claim 20, wherein at least some of the data records are encrypted prior to recording.

23. The method of claim 20, wherein the hash value of a record is determined based at least on a payload in a predecessor record and a linkage function.

24. The method of claim 23, wherein the linkage function is a cryptographic function.

25. The method of claim 23, wherein the linkage function changes periodically.

26. The method of claim 25, wherein the periodic change in linkage function is based on a protocol known to the distributed network system and an escrow service.

27. The method of claim 20, wherein if the management infrastructure payload stripped stream of said audit blockchain of first data records matches at least some of the escrow payload stripped stream, verifying the audit blockchain of first data records.

* * * * *